(12) United States Patent
Mondragon et al.

(10) Patent No.: US 11,057,108 B1
(45) Date of Patent: Jul. 6, 2021

(54) OUT-OF-BAND COMMISSIONING IN A LUMINAIRE OR OTHER RADIO FREQUENCY NETWORK USING VISIBLE LIGHT COMMUNICATION

(71) Applicant: ABL IP HOLDING LLC, Conyers, GA (US)

(72) Inventors: Antonio F. Mondragon, Cambridge, MA (US); Sajin George, Somerville, MA (US); Mitri J. Abou-Rizk, Newton, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 17/003,348

(22) Filed: Aug. 26, 2020

(51) Int. Cl.
*H04B 10/116* (2013.01)
*H04B 10/50* (2013.01)
*H04B 10/516* (2013.01)
*H04B 10/114* (2013.01)

(52) U.S. Cl.
CPC ....... *H04B 10/116* (2013.01); *H04B 10/1149* (2013.01); *H04B 10/502* (2013.01); *H04B 10/516* (2013.01)

(58) Field of Classification Search
CPC .......................... H04B 10/116; H04B 10/1149; H04B 10/502; H04B 10/516
USPC .......................................................... 398/118
See application file for complete search history.

(56) References Cited

U.S. PATENT DOCUMENTS

| 7,352,972 B2 * | 4/2008 | Franklin | H05B 47/175 398/172 |
| 7,734,181 B2 * | 6/2010 | Bahar | H04L 63/18 398/115 |
| 9,287,976 B2 | 3/2016 | Ganick et al. | |
| 2015/0147067 A1 * | 5/2015 | Ryan | H04W 4/02 398/118 |

(Continued)

OTHER PUBLICATIONS

BLUETOOTH® Blog, "Provisioning a Bluetooth Mesh Network Part 2," Ren, Kai, "Bluetooth Low Energy, Connected Device, Device Networks, Mesh," Sep. 25, 2017, Chapter 10 of the Bluetooth Mesh Networking Series, https://www.bluetooth.com/blog/provisioning-a-bluetooth-mesh-network-part-2/ (9 pages).

*Primary Examiner* — Dalzid E Singh
(74) *Attorney, Agent, or Firm* — RatnerPrestia

(57) ABSTRACT

A lighting system employs out-of-band (OOB) commissioning techniques, and includes a plurality of uncommissioned luminaires located in a space and a commissioning device. The commissioning device receives, via a visible light camera, over a VLC communication band, a respective VLC code of a respective uncommissioned luminaire. Commissioning device receives via a radio frequency (RF) transceiver, over an RF commissioning network band, a respective RF identifier of the respective uncommissioned luminaire. In response to receiving the respective VLC code and the respective RF identifier, commissioning device determines whether the respective uncommissioned luminaire is in a candidate luminaire roster of candidate luminaires suitable for commissioning in the space. Based on the determination of whether respective uncommissioned luminaire is in the candidate luminaire roster, commissioning device accepts or rejects commissioning of the respective uncommissioned luminaire in the space.

20 Claims, 18 Drawing Sheets

(56) References Cited

U.S. PATENT DOCUMENTS

| | | | | |
|---|---|---|---|---|
| 2017/0245351 A1* | 8/2017 | Leinen | ................... | H05B 47/11 |
| 2017/0318460 A1* | 11/2017 | Kumar | .................. | H04L 9/3252 |
| 2019/0014250 A1* | 1/2019 | Stout | ...................... | H04N 5/378 |
| 2020/0245424 A1* | 7/2020 | Stout | .......................... | G01S 5/16 |

* cited by examiner

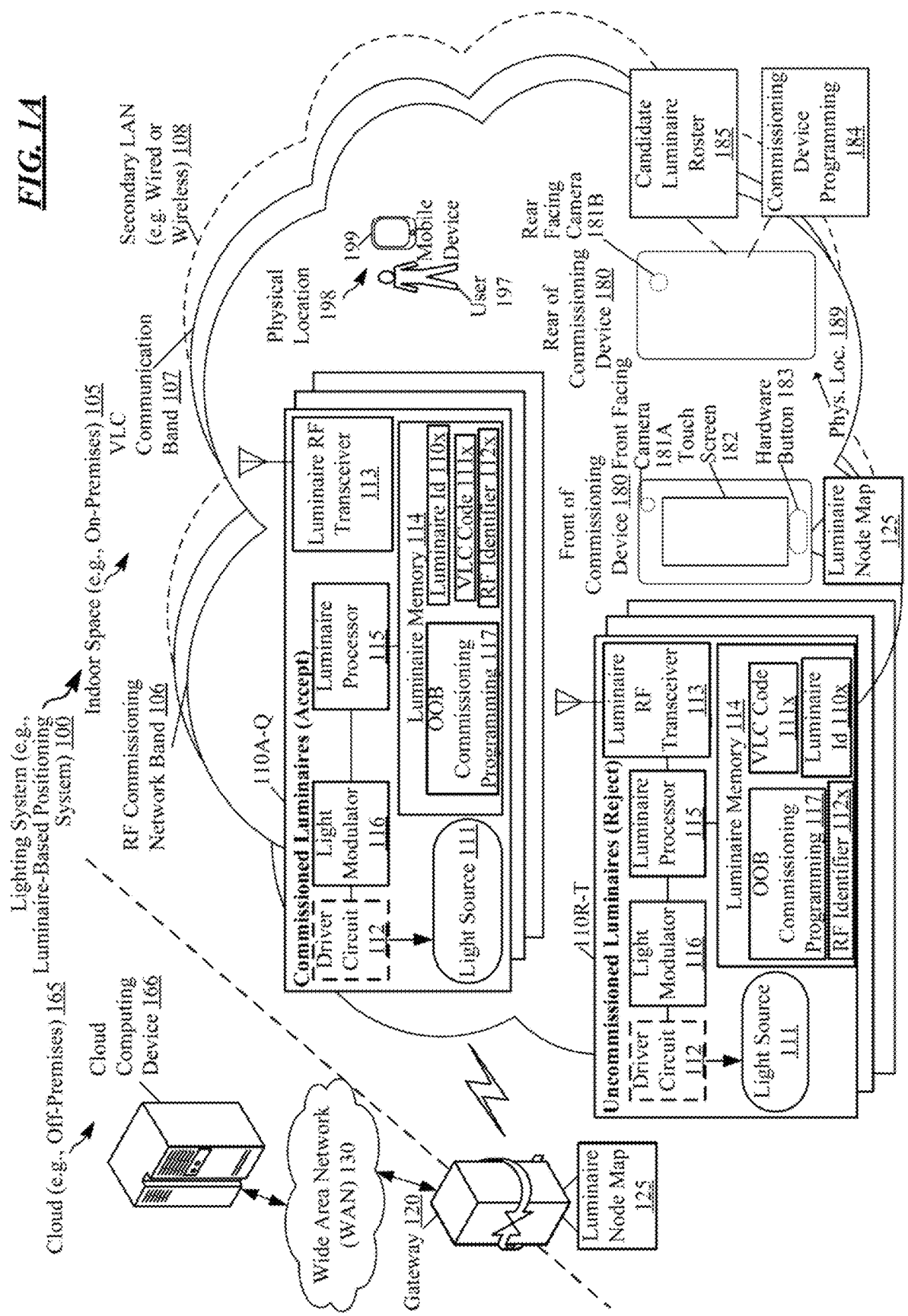

*FIG. 1D*

Luminaire Node Map 125 → Commissioned Luminaire Settings 126A-Q

| Commissioned Luminaire Position | Commissioned Luminaire Identifier 128A-Q | VLC Code 129A-Q | RF Identifier 131A-Q | Set of Location Coordinates 127A-Q | |
|---|---|---|---|---|---|
| | | | | X Location Coordinate | Y Location Coordinate |
| 1 | 110A | 111A | 112A | 1 | 1 |
| 2 | 110B | 111B | 112B | 2 | 1 |
| 3 | 110C | 111C | 112C | 3 | 1 |
| 4 | 110D | 111D | 112D | 4 | 1 |
| 5 | 110E | 111E | 112E | 5 | 1 |
| 6 | 110F | 111F | 112F | 6 | 1 |
| 7 | 110G | 111G | 112G | 1 | 2 |
| 8 | 110H | 111H | 112H | 2 | 2 |
| 9 | 110I | 111I | 112I | 3 | 2 |
| 10 | 110J | 111J | 112J | 4 | 2 |
| 11 | 110K | 111K | 112K | 5 | 2 |
| 12 | 110L | 111L | 112L | 6 | 2 |
| 13 | 110M | 111M | 112M | 1 | 3 |
| 14 | 110N | 111N | 112N | 2 | 3 |
| 15 | 110O | 111O | 112O | 3 | 3 |
| 16 | 110P | 111P | 112P | 4 | 3 |
| 17 | 110Q | 111Q | 112Q | 5 | 3 |
| 18 | 110R | 111R | 112R | 1 | 4 |
| 19 | 110S | 111S | 112S | 2 | 4 |
| 20 | 110T | 111T | 112T | 3 | 4 |

*FIG. 2B*

Candidate RF Node (e.g., Candidate LSE) Roster 285

| Candidate Lighting System Elements | Candidate VLC Code 141A-T | Candidate RF Identifier 142A-T |
|---|---|---|
| 1 | 111A | 112A |
| 2 | 111B | 112B |
| 3 | 111C | 112C |
| 4 | 111D | 112D |
| 5 | 111E | 112E |
| 6 | 111F | 112F |
| 7 | 111G | 112G |
| 8 | 111H | 112H |
| 9 | 111I | 112I |
| 10 | 111J | 112J |
| 11 | 111K | 112K |
| 12 | 111L | 112L |
| 13 | 111M | 112M |
| 14 | 111N | 112N |
| 15 | 111O | 112O |
| 16 | 111P | 112P |
| 17 | 111Q | 112Q |
| 18 | 111U | 112U |
| 19 | 111V | 112V |
| 20 | 111W | 112W |

*FIG. 2C*

Lighting System Element Node Map 225

Commissioned LSE Settings 226A-T

| Commissioned Lighting System Element Position | Commissioned Lighting System Element Identifier 228A-T | VLC Code 229A-T | RF Identifier 231A-T | Set of Location Coordinates 127A-Q, 127U-W | |
|---|---|---|---|---|---|
| | | | | X Location Coordinate | Y Location Coordinate |
| 1 | 209A | 111A | 112A | 1 | 1 |
| 2 | 209B | 111B | 112B | 2 | 1 |
| 3 | 209C | 111C | 112C | 3 | 1 |
| 4 | 209D | 111D | 112D | 4 | 1 |
| 5 | 209E | 111E | 112E | 5 | 1 |
| 6 | 209F | 111F | 112F | 6 | 1 |
| 7 | 209G | 111G | 112G | 1 | 2 |
| 8 | 209H | 111H | 112H | 2 | 2 |
| 9 | 209I | 111I | 112I | 3 | 2 |
| 10 | 209J | 111J | 112J | 4 | 2 |
| 11 | 209K | 111K | 112K | 5 | 2 |
| 12 | 209L | 111L | 112L | 6 | 2 |
| 13 | 209M | 111M | 112M | 1 | 3 |
| 14 | 209N | 111N | 112N | 2 | 3 |
| 15 | 209O | 111O | 112O | 3 | 3 |
| 16 | 209P | 111P | 112P | 4 | 3 |
| 17 | 209Q | 111Q | 112Q | 5 | 3 |
| 18 | 209U | 111U | 112U | 4 | 4 |
| 19 | 209V | 111V | 112V | 5 | 4 |
| 20 | 209W | 111W | 112W | 6 | 4 |

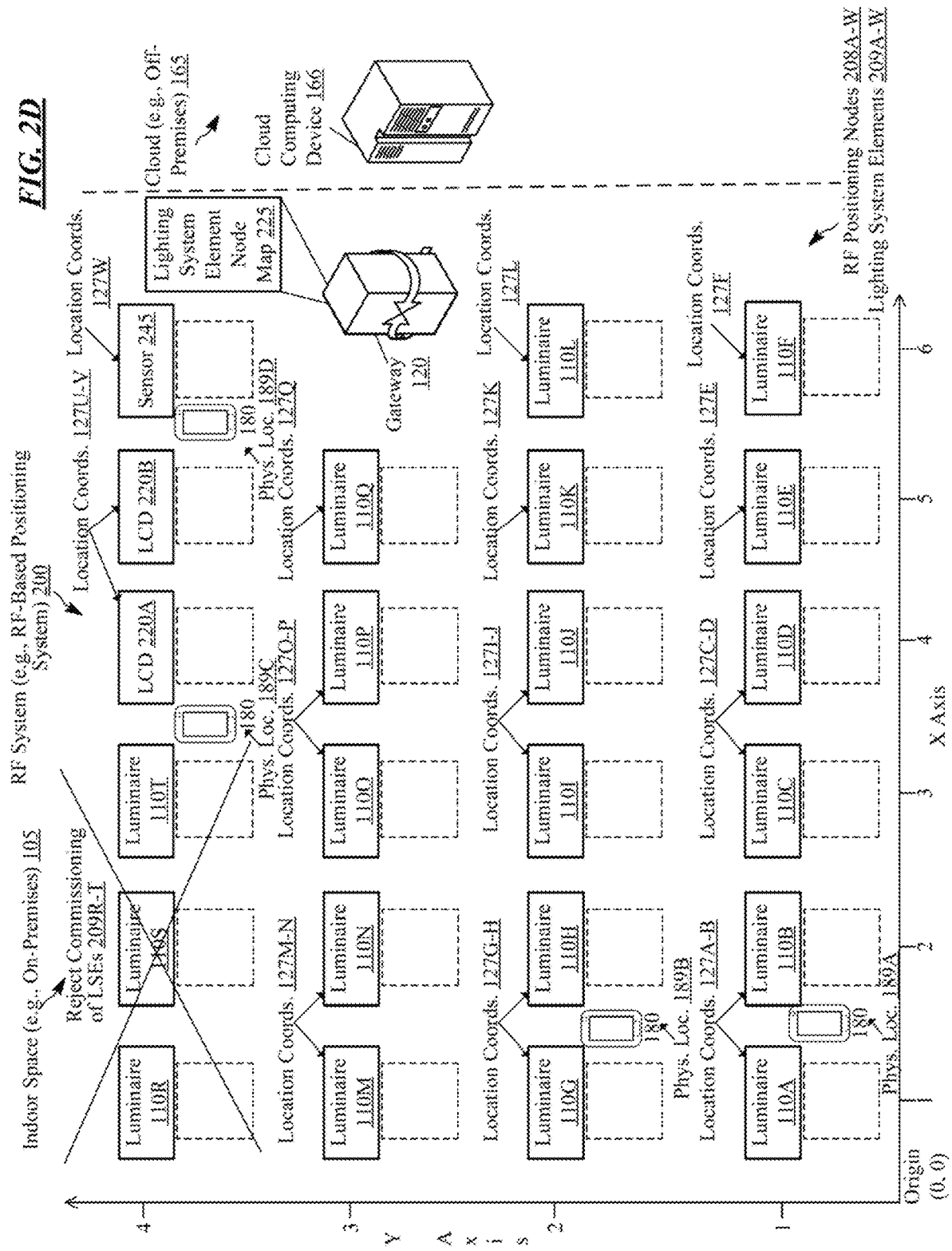

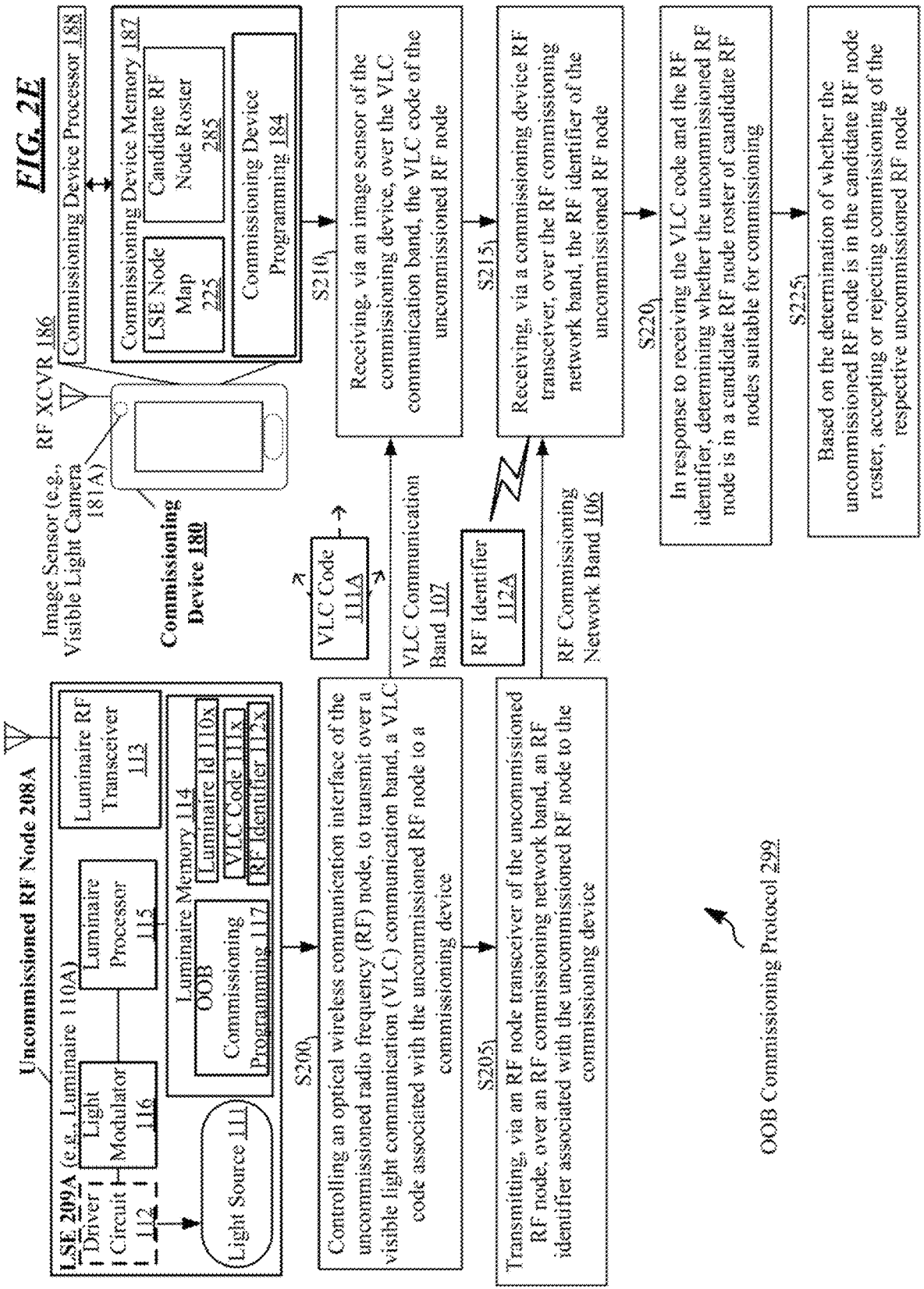

US 11,057,108 B1

OUT-OF-BAND COMMISSIONING IN A LUMINAIRE OR OTHER RADIO FREQUENCY NETWORK USING VISIBLE LIGHT COMMUNICATION

TECHNICAL FIELD

The present subject matter relates to examples of commissioning radio frequency (RF) devices on a radio frequency (RF) network. The present subject matter also encompasses a lighting system, such as a luminaire-based (e.g., indoor or outdoor) positioning systems having luminaires networked through a wireless network, e.g., Bluetooth Low Energy (BLE), and commissioning the luminaires on the wireless network.

BACKGROUND

Commissioning typically adds RF devices to a wireless network, or establishes a wireless link between two RF devices. Once commissioned, an RF device becomes an RF node of the wireless network.

In a lighting system, such as a luminaire-based (e.g., indoor or outdoor) positioning system having RF nodes, e.g., luminaires, networked through some wireless communications technology, e.g., BLE, typically it is necessary to know the physical locations of the luminaires. Without this knowledge, proximity of a mobile device (e.g., a smartphone) cannot be translated into an estimate of a physical location of the mobile device.

Therefore, such a luminaire-based positioning system typically includes a luminaire node map, which is a table of known physical location coordinates associated with each of the commissioned luminaires. For example, if a mobile device carried by a user measures the relative strengths of signals from three nearby commissioned neighbors (e.g., luminaires) of known physical location coordinates and known broadcast power, those signal strengths may be used to estimate the mobile device's position relative to the luminaires and thus a position of the user.

Commissioning, also known as provisioning, is the acceptance of RF nodes, e.g., luminaires, into the wireless network. Typically, qualified technicians travel to locations of the indoor space needing commissioning of the luminaires and carry out commissioning of the luminaires. Commissioning presents problems that are distinct from the routine functioning of the wireless network. In particular, commissioning should minimize the possibility that unauthorized RF devices are commissioned into the wireless network as RF nodes due to malice or error.

Routine networked communications of commissioned RF nodes constitute "in-band" signaling. An in-band signaling key exchange transmits a key to the RF device to be commissioned over the same RF channel as the underlying RF communication network. The security flaw of in-band signaling is that other RF devices can sniff the in-band RF signaling and obtain the key.

Hence, exchanges with uncommissioned RF devices utilize out-of-band (OOB) communication. OOB communication must, by its nature, present barriers; otherwise, it does not exclude malice and error. However, time-consuming and labor-intensive OOB communication incurs costs, which should be minimized. It is therefore desirable that an OOB method for authentication should, as far as possible, ensure the commissioning only of authorized RF devices while incurring minimal complication and cost.

Four OOB commissioning methods are proposed in the commonly used BLE schema for authentication as part of the RF device commissioning processes. In the BLE schema, a "candidate" is an RF device that is not yet, but may be, commissioned into a wireless network, and the "provisioner" of a wireless network is an RF device that oversees and directs OOB communication with candidates and the commissioning of approved candidates. Both candidates and provisioners are capable of executing programs and processing data. Following are the four OOB commissioning methods.

First, in the "no OOB" method, a secure link is established between a provisioner and an RF device without having carried out any form of OOB authentication, and the RF device is then incorporated into the wireless network as an RF node. When the no OOB approach is used with BLE devices, the provisioner and candidate go straight to a series of exchanges known as the Check Confirmation Value (CCV) operation." This CCV operation occurs with or without OOB authentication.

Second, in the "Output OOB" method, the candidate generates a random number and then physically displays or exhibits that number. In an example, a candidate blinks a random number of times or visually displays random digits. An installer (worker) counts or observes the number and enters it into a mobile device, which communicates with the provisioner. Now the provisioner and the candidate both possess the same random number and can, if they are BLE devices, proceed to the CCV Operation.

The third "Input OOB" method is the same as Output OOB, only the roles of the provisioner and candidate are reversed.

Fourth, in the "Static OOB" method, a random number (key), a.k.a. "a static key," is known to both the provisioner and candidate, e.g., by being programmed into both the provisioner and candidate before the commissioning process (e.g., at a factory). The provisioner and the candidate exchange keys. If the received key and static key match, commissioning proceeds.

There are limitations to all the foregoing methods. With no OOB, although the link is secure, there is no guarantee that the device thus commissioned is an on-site, authorized RF device. Input OOB or Output OOB can be cumbersome or time-consuming, e.g., counting a random number of light blinks, or reading and re-entering a random number shown on a display, is a slow and error-prone process. Moreover, such random numbers are restricted in size by the need for manual re-entry, and as with short passwords generally, short keys are a security flaw. Nor does static OOB or any other method conducted entirely through RF physically verify the on-site presence of a candidate.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1A is a high-level functional block diagram of an example of a lighting system of networks and devices that support commissioning of luminaires of an indoor space (e.g., on premises).

FIG. 1D is a luminaire node map of the lighting system of FIGS. 1A-B depicted in a table format.

FIG. 2B is a candidate lighting system element (LSE) roster of the RF system (e.g. lighting system) of FIG. 2A depicted in table format.

FIG. 2C is an LSE node map of the RF system of FIGS. 2A-B depicted in a table format.

FIG. 2D is a schematic of the RF system of FIGS. 2A-C that includes a visual layout of twenty commissioned LSEs as represented by a respective set of location coordinates.

FIG. 2E is an OOB commissioning protocol procedure for the RF system (e.g. lighting system) that is implemented by an uncommissioned RF node and a commissioning device of FIGS. 2A-D and FIGS. 1A-E.

DETAILED DESCRIPTION

Figure 1B:
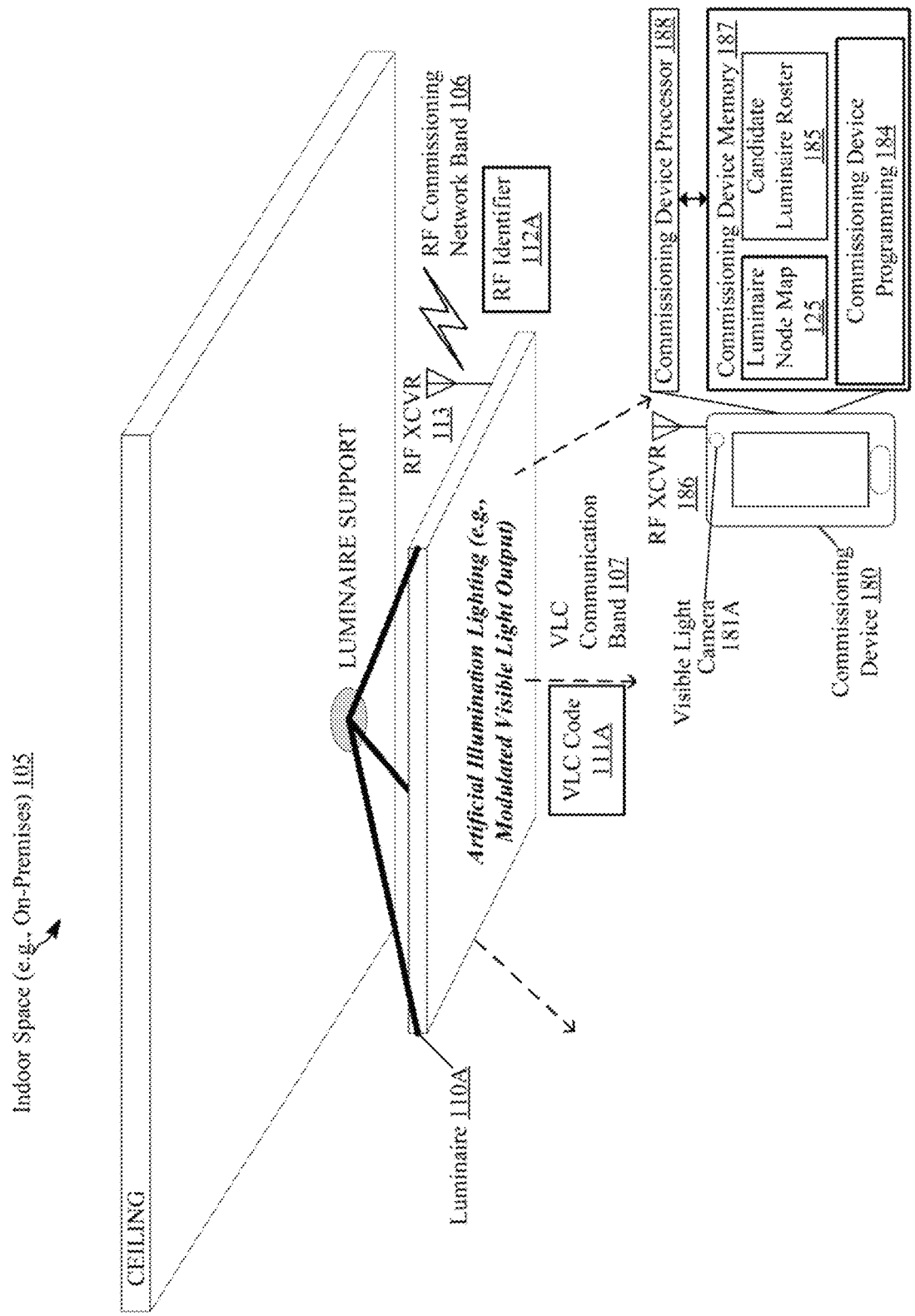
FIG. 1B is an isometric view of a luminaire mounted in the indoor space and in communication with a commissioning device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the examples, herein, the luminaires 110A-T and lighting system elements 209A-W are just one example of RF nodes 208A-W. The OOB commissioning techniques, such as OOB protocol 299, described herein can be applied to other types of RF nodes 208A-W. Generally, the RF node 209A includes a minimum subset of components of the lighting system elements 209A (e.g., luminaire 110A) shown in FIG. 5, such as the multi-band communication interface system 340, memory 114 (including the depicted OOB commissioning programming 117 and data, such as VLC code 111A, RF identifier 112A), processor 115, and power supply 305. However, the RF node does not have to include the light source 111, driver circuit 112, drive/sense circuitry 335, and detector(s) 365 components.

The examples in the drawings and described below generally relate to commissioning RF devices as RF nodes 209A-W in an RF system 200. In on example, during commissioning of a luminaire-based positioning system, a virtual map of a physical installation of luminaires 110A-Q within an indoor space 105 of a room, building, etc. or an outdoor space (e.g., streetlights) is created.

Although the discussion herein is focused on light fixture type luminaires that have a fixed position in a space, it should be understood that other types of luminaires can be used/sensed in lieu of light fixtures, such as lamps, particularly if the lamps have a fixed position in the space. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "luminaire-based positioning system" or "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below. FIG. 1A is a high-level functional block diagram of an example of a lighting system 100 of networks and devices that support commissioning of luminaires 110A-T of an indoor space (e.g., on premises) 105. Lighting system 100 provide a variety of communications in support of determining a physical location 198 of a mobile device 199 of a user 197 in the indoor space 105. In the example of FIGS. 1A-E, the lighting system 100 includes a luminaire-based positioning system formed of a plurality of commissioned luminaires 110A-Q for a positioning application to determine physical location 198 in the indoor space 105 of a mobile device 199 of a user 197 and/or an RF asset tag of a movable asset in the indoor space 105. But the OOB commissioning protocols and procedures do not need to be used in a positioning application and can more generally be used to commission the luminaires 110A-T into a wireless RF communication network of the lighting system 100. Although described in terms of luminaires 110A-T and the indoor space 105 (e.g., on premises), the luminaires 110A-T are just one example of a deployment environment of an RF node 208A-W, which can be deployed in other ways, as described in FIGS. 2A-E below.

As shown, lighting system 100 includes a plurality of luminaires 110A-T located in the indoor space 105, such as a grocery store. The plurality of luminaires 110A-T includes seventeen (17) commissioned luminaires 110A-Q and three (3) uncommissioned luminaires 110R-T. Although the example lighting system 100 is described for the indoor space 105, the lighting system 100 can be deployed in an outdoor space (e.g., using streetlights).

Each respective one of the luminaires 110A-T includes a light source 111 to emit visible light; a driver circuit 112. Driver circuit 112 includes a light modulator 116 (e.g., firmware) coupled to the light source 111 to modulate the emitted visible light from the light source 111 for visible light communication (VLC) over a VLC communication band 107. A VLC communication band 107 is a data communications network variant, which uses visible light between 400 and 800 THz (780-375 nm), and is a subset of optical wireless communications technologies. VLC can be done by having luminaires 110A-T output oscillating visible light (e.g., projection of a barcode) in combination with the illumination space lighting.

The circuits comprising the driver circuit 112 can include solid state transistors controlled by a digital input. Driver circuit 112 turns general illumination light source 111, e.g., LEDs, on and off by allowing or preventing current flow. When current flows through the driver circuit 112 with the switches closed the LEDs turn on, and when the switches are open in the modulator no current can flow and the LEDs turn off.

The light modulator 116 modulates the light source 111, such as general illumination light source 111, on and off to optically send light signals encoding data. When the light modulator 116 is controlled by an additional logic component, such as luminaire processor 115, the light modulator 116 has the ability to send repeating patterns of on/off signals in order to transmit digital data through the visible light. The light modulator 116 interfaces directly in between the driver circuit 112, and is controlled by the luminaire processor 115.

The luminaire processor 115 provides the digital input signal to the light modulator 116. The luminaire processor 115 sends a pre-determined sequence of signals to the light modulator 116 which then interfaces with circuitry of driver circuit 112 to modulate the outgoing visible light from the general illumination light source 111. The luminaire processor 115 provides the digital input signal to the light modulator 116. This function can also be achieved using a field programmable gate array (FPGA), but typically consumes more power with added complexity.

The light source 111 may be virtually any type of light source 111 suitable to providing the intended type of light output that may be electronically controlled. The light source 111, for example, may provide visible light output as providing visible illumination for human occupancy or the like and/or visible light source based positioning. The light source 111 may be of the same general type in all of the luminaires 110A-T, e.g. all formed by some number of light emitting diodes (LEDs); although in many installations, some numbers of the luminaires 110A-T may have different types of light sources 111, e.g. some use LEDs, some use compact or tube type fluorescent sources, etc. Thus, the light source 111 can include one or more organic light emitting diodes (OLEDs); one or more micro LEDs; one or more nanorod or nanowire LEDs; at least one fluorescent lamp; or at least one halogen lamp. An LED type of light source 111 typically utilizes a driver circuit 112 to control light source operation.

In the examples herein, the luminaires 110A-T include at least one or more components forming a light source 111 for generating the artificial illumination light for a general lighting application as well as a local wireless network communication interface, shown as luminaire RF transceiver 113. In several illustrated examples, such luminaires 110A-T may take the form of a light fixture, such as a pendant or drop light or a downlight, or wall wash light or the like. For example, luminaires 110A-T include a pendant down light suspended/hanging from the ceiling, a 2×4 feet light fixture flush mounted on the ceiling, or sconces hung on the wall. Other fixture mounting arrangements are possible. For example, at least some implementations of the luminaires 110A-T may be surface mounted on or recess mounted in a wall, ceiling or floor. Orientation of the luminaires 110A-T and components thereof are shown in the drawings and described below by way of non-limiting examples only. The luminaires 110A-T may take other forms, such as lamps (e.g. table or floor lamps or street lamps) or the like. Additional devices, such as fixed or controllable optical elements, may be included in the luminaire, e.g. to selectively distribute light from the illumination light source.

Each respective one of the luminaires 110A-T further include a luminaire radio frequency (RF) transceiver (XVR) 113 configured for short-range wireless communication over an RF commissioning network band 107. In the example, the RF commissioning network band 106 is for a local wireless communication network, such as wireless mesh network (e.g., ZigBee, DECT, NFC, etc.), a personal area network (e.g., Bluetooth or Z-Wave), or Wi-Fi.

Each respective one of the luminaires 110A-T further includes a luminaire memory 114 and a luminaire processor 115. Luminaire memory 114 includes: (i) a respective luminaire identifier 110A-T of the uncommissioned luminaire 110A-T, (ii) a respective VLC code 11A-T associated with the respective uncommissioned luminaire identifier 110A-T, and/or (iii) a respective RF identifier 112A-T associated with the respective uncommissioned luminaire identifier 110A-T. For example, the respective VLC code 111A-T is for positioning of a mobile device 199 of the user 197. Additionally, the respective RF identifier 112A-T can be for positioning of an RF asset tag coupled to a movable asset in the indoor space 105. RF identifier 112A-T can be a media access control (MAC) address or a universally unique identifier (UUID). For example, the movable asset can be a store-based asset, such as, a shopping cart, a product, or a point of purchase (POP) display or floor display that includes signage or graphics to communicate information about a product, etc. Luminaire processor 115 is coupled to the light modulator 116, the luminaire RF transceiver 113, and the luminaire memory 114.

Figure 3:
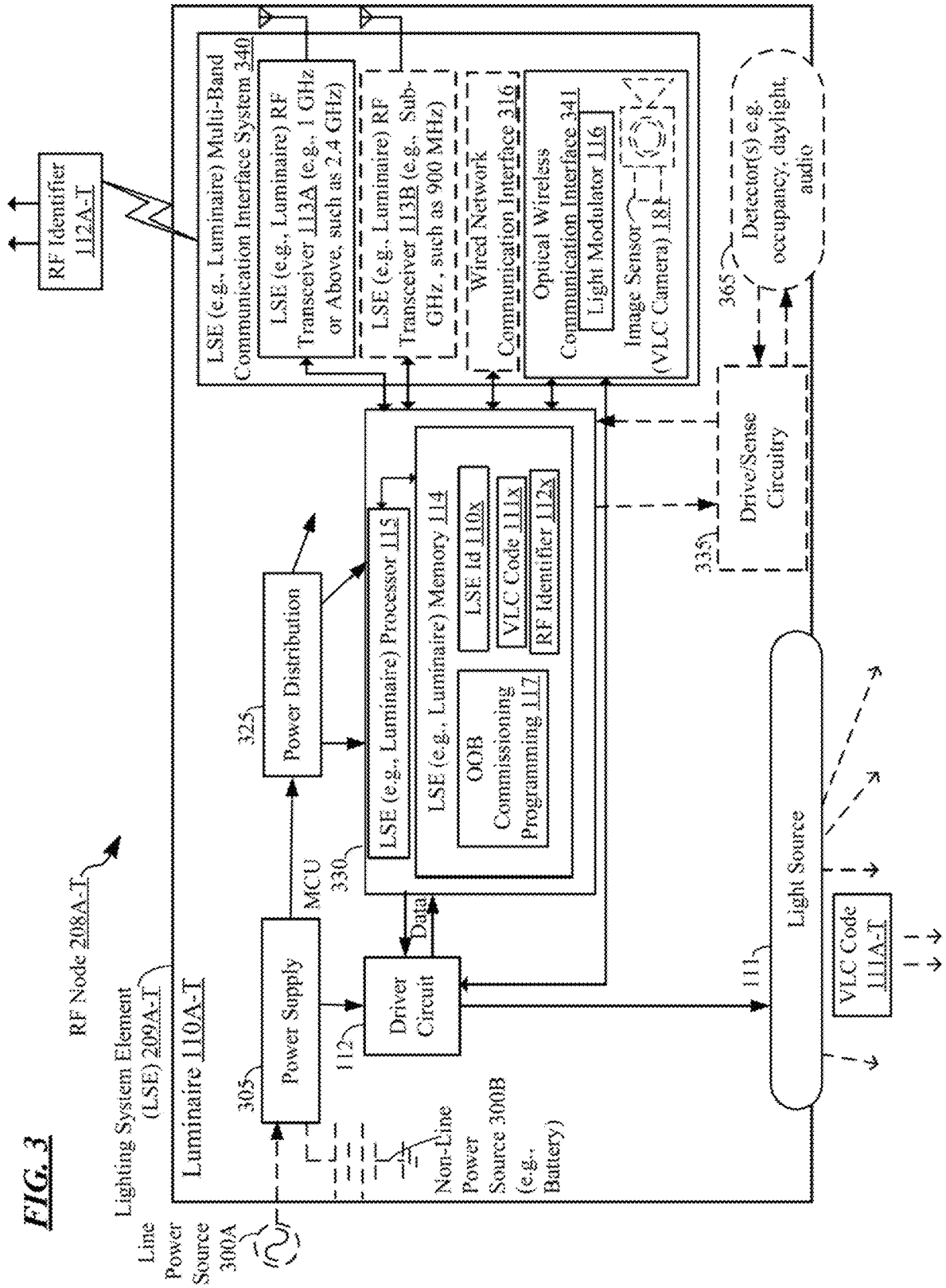
FIG. 3 is a block diagram of RF nodes (e.g., LSEs), specifically luminaires, that communicate via the RF system of FIGS. 2A-E and lighting system of FIGS. 1A-E.

As further described in FIG. 3, the luminaires 110A-T can include a luminaire multi-band communication interface system 340 that may include separate radios that operate at two different frequencies, such as a first wireless luminaire RF transceiver 113A at 1 GHz or above (e.g., 2.4 GHz for BLE), and a second wireless luminaire RF transceiver 113B at sub-GHz (e.g., 900 MHz for WiFi). In some examples, the luminaire RF transceivers 113A-B can operate at 5 GHz.

The luminaires 110A-T are commissioned (i.e., provisioned) with a commissioning device 180 that includes commissioning device programming 184 for the OOB commissioning functions of the lighting system 100. For example, commissioning device 180 enables OOB commissioning of luminaries 110A-T and can be a handheld mobile device (e.g., mobile phone, tablet computer, laptop computer, etc.) with human interfacing mechanisms sufficient to perform clear and uncluttered user directed operations. Commissioning device 180 includes a front facing visible light camera 181A, a touch screen 182, a hardware button 183 located on a front side, and a rear facing visible light camera 181B located on a rear side of the commissioning device 180. Visible light cameras 181A-B can include a rolling shutter camera for VLC communication purposes.

In some examples, the lighting system 100 can include an unmanned aerial vehicle (UAV), such as a drone, or a robot that includes the commissioning device 180. The UAV or the robot is configured to autonomously traverse the indoor space 105, such that the implemented OOB commissioning functions described herein are iteratively performed for each of the plurality of the uncommissioned luminaires 100A-T located in the indoor space 105.

Lighting system 100 further includes a gateway 120. The gateway 120 is a device that provides access between a wide area network (WAN) 130 and the local wireless communication network 106. The WAN 130 (e.g., Internet) can be a cellular network, optical fiber, cable network, or satellite network that can be connected to via Ethernet, for example. The gateway 120 may provide routing, access, and other services for the luminaires 110A-T residing at the indoor space 105, for example.

Lighting system 100 further includes a cloud computing device 166, and the cloud computing device 166 resides off-premises meaning the cloud computing device 166 is a remote server hosted on the Internet to store, manage, and process data, rather than the local gateway 120.

It should also be understood that the communication protocols over the RF commissioning network band 106 may be varied, and thus may be via nLight® (commercially available from Acuity Brands Lighting), digital multiplex (DMX) control, Fresco® control network (FCN) (commercially available from Acuity Brands Lighting). FCN, DMX control, nLight®, and Z-Wave are lighting-centric networks that control a variety of luminaires 110A-T. The WAN 130 is a separate network but with a shared application protocol for commissioning of the luminaires 110A-T. It should be appreciated, however, that the local wireless communication network RF of the commissioning network band 106 and WAN 130 in a different implementation may be a different part of the same network tree or star network, and therefore may not be separate networks and can utilize the same network communication protocols. In some examples, the lighting system 100 can further include an optional secondary network 108 (e.g., wired or wireless LAN), such as a backhaul network for communication between the luminaires 110A-T, commissioning device 180, and the gateway 120.

In a first example, the commissioning device 180 itself updates a luminaire node map 125 to commission the luminaires 110A-T. In a second example, the commissioning device 180 is in communication with the gateway 120 via the secondary LAN 108 to commission the luminaires 110A-T, and the gateway 120 updates the luminaire node map 125. In a third example, the gateway 120 is a conduit that sends collected data over the WAN 130 to the cloud computing device 166, which actually updates the luminaire node map 125 to commission the luminaires 110A-T.

FIG. 1B is an isometric view of a luminaire 110A mounted in the indoor space 105 and in communication with the commissioning device 180. In the example of FIG. 1B, the drop light fixture type luminaire 110A was hung below the ceiling by multiple support rods or cables attached to a number of brackets on the luminaire 110A. The example of FIG. 1B represents a pendant type light fixture implementation of the luminaire 110A in which the fixture has a bracket on a surface opposite the artificial illumination lighting output, providing an attachment point for a single strut attached to or through the ceiling. Other aspects of structure, orientation and operation of the other luminaire 110B-T is generally similar to the luminaire 110A discussed herein. Location of electronics should be decided (e.g. in ceiling or on fixture) size and weight considerations, since fixture weight may be an issue. For example, the electronics of the lighting device may be in the suspended luminaire portion or included in or near the support structure in our above the ceiling to reduce the weight held below the ceiling by the support(s) and bracket(s).

As shown in FIGS. 1A-B, the respective luminaire 110A-T includes OOB commissioning programming 117 in the luminaire memory 114. Execution of the OOB commissioning programming 117 by the luminaire processor 115 configures the respective uncommissioned luminaire 110A-T to implement the following functions. Uncommissioned luminaire 110A-T controls the light source 111, via the light modulator 116, to transmit over the VLC communication band 107, the respective VLC code 111A-T to the commissioning device 180. Uncommissioned luminaire 110A-T transmits, via the luminaire RF transceiver 113 over the RF commissioning network band 107, the respective RF identifier 112A-T to a commissioning device 180. For example, uncommissioned luminaire 110A-T RF broadcasts, via the luminaire RF transceiver 113 over the RF commissioning network band 106, on a respective RF channel, an advertisement packet that includes the respective RF identifier 112A-T. On the respective RF channel, the uncommissioned luminaire 110A-T transmits a commissioning state indicator (e.g., flag) that signifies that the uncommissioned luminaire 110A-T is in an uncommissioned state.

Commissioning device 180 includes the commissioning device visible light camera 181A to receive VLC over the VLC communication band 107. Commissioning device 180 further includes a commissioning device RF transceiver 186 configured for short-range wireless communication over the RF commissioning network band 106. Commissioning device 180 further includes a commissioning device memory 187 and a commissioning device processor 188 coupled to the visible light camera 181A, a commissioning device multi-band communication interface system 440 (e.g., includes visible light camera 181A and commissioning device RF transceiver 186), and the commissioning device memory 187. Commissioning device 180 further includes the commissioning device programming 184 in the commissioning device memory 186.

Typically, at manufacture, luminaires 110A-T are programmed with a distinctive first identification (ID) number, e.g. VLC code 111A-T that is distinct from a second ID number of the RF identifier 112A-T. Alternatively or additionally, the VLC code 111A-T can be a random number generated by the luminaires 110A-T to serve as a distinctive temporary ID or a nonce string. In another alternative VLC code 111A-T is a distinctive number, such as a true luminaire identifier 110A-T persistently associated with the luminaires 110A-T or just a random number into the luminaire memory 114 of the luminaire 110A-T after manufacture, but before commissioning. In any case, the luminaire 110A-T is capable of broadcasting data, including the distinctive VLC code 111A-T, which can be a random number or a series of numbers, to an environment, such as indoor space 105, by modulating a respective visible light output in a manner not visible to the human eye. The visible light output is detectable by commissioning device 180 (e.g., via visible light cameras 181-B) and can be quickly decoded. A common method of VLC modulation is to rapidly vary luminaire brightness too quickly for a human eye to detect. F1

Execution of the commissioning device programming 184 by the commissioning device processor 188 configures the commissioning device 180 to implement the following functions. Commissioning device 180 receives, via the commissioning device visible light camera 181A-B, over the VLC communication band 106, the respective VLC code 111A-T of the respective uncommissioned luminaire 110A-T. Commissioning device 180 receives, via the commissioning device RF transceiver 186, over the RF commissioning network band 107, the respective RF identifier 112A-T of the respective uncommissioned luminaire 110A-T. In response to receiving the respective VLC code 111A-T and the respective RF identifier 112A-T, commissioning device 180 determines whether the respective uncommissioned luminaire 110A-T is in a candidate luminaire roster 185 of candidate luminaires suitable for commissioning in the space 105. Determining whether the respective uncommissioned luminaire 110A-T is in the candidate luminaire roster 185 of candidate luminaires suitable for commissioning in the indoor space 105 can be further in response to receiving the respective VLC code 111A-T and the respective RF identifier 112A-T within a predetermined time period of each other. Based on the determination of whether respective uncommissioned luminaire 110A-T is in the candidate luminaire roster 185, commissioning device 180 accepts or rejects commissioning of the respective uncommissioned luminaire 110A-T in the space 105.

After having commissioned the luminaires 110-Q, a provisioning device, such as the commissioning device 180, may later transmit the updated luminaire node map 125 that includes the results of commissioning to the gateway 120 or a back-end device, such as cloud computing device 166, through the WAN 130. The results of commissioning, e.g., identifying data for both accepted luminaires 110A-Q for commissioning and rejected luminaires 110R-T for commissioning can be written by the provisioning device, such as the commissioning device 180, to a database. The database can be transmitted to other devices (e.g., gateway 120 and cloud computing device 166).

In another example, the provisioning device is the gateway 120, which acts a standalone provisioner. Alternatively, the provisioning device is the cloud computing device 166. For example, the cloud computing device 166 communicates via the gateway 120 to luminaires 110A-T that are connected to the RF commissioning network band 106 or secondary LAN 108. Many variations on these arrangements are possible; and all are encompassed by various embodiments of the OOB commissioning techniques described herein.

Figure 1C:
FIG. 1C is a candidate luminaire roster of the lighting system of FIGS. 1A-B depicted in table format.

FIG. 1C is the candidate luminaire roster 185 of the lighting system 100 of FIGS. 1A-B depicted in table format. Generally, candidate luminaire roster 185 includes a roster of VLC codes 111A-T (and, in some examples, RF identifiers 112A-T) for luminaires 112A-T suitable for commissioning in the indoor space, e.g., authorized for installation at the network location.

Seventeen (17) candidate luminaires are identified as suitable for commissioning in the space 105. Candidate luminaire roster 185 includes a plurality of candidate VLC codes 141A-Q and a plurality of candidate RF identifiers 142A-Q. As shown, a respective candidate VLC code 141A-Q is associated with a respective candidate RF identifier 142A-Q. Based on the candidate luminaire roster 185, the commissioning device 180 accepts commissioning of luminaires 110A-Q in the space 105 and rejects commissioning of luminaires 110R-T in the space 105.

The function to determine whether the respective uncommissioned luminaire 110A-T is in the candidate luminaire roster 185 of candidate luminaires suitable for commissioning in the space 105 includes to: compare the respective VLC code 111A-T and the respective RF identifier 112A-T with the candidate luminaire roster 185 for a match of both the respective candidate VLC code 141A-Q and the associated respective candidate RF identifier 142A-Q.

FIG. 1D is the luminaire node map 125 of the lighting system 100 of FIGS. 1A-B depicted in a table format. The luminaire node map 125 is of commissioned luminaires 110A-Q in the indoor space 105. Based on the candidate luminaire roster of FIG. 1C, commissioning device 180 accepted each of luminaires 110A-Q for commissioning and rejected each of luminaires 110R-T for commissioning. In response to the luminaires 110A-Q being commissioned, a luminaire-based positioning system is formed by commissioned luminaires 110A-Q.

Thus, only each of the seventeen commissioned luminaires 110A-Q is assigned a commissioned luminaire position 1-17, shown as a plurality of commissioned luminaire settings 126A-Q, in the luminaire node map 125 ranging from one to seventeen. The seventeen positions cover most of the area of the indoor space 105 for which positioning of the mobile device 199 of the user is 197 is desired. As shown, a respective commissioned luminaire setting 126A-Q of a respective commissioned luminaire 110A-Q includes: (a) a respective luminaire identifier 110A-Q of the respective commissioned luminaire 110A-Q (stored as commissioned luminaire identifier 128A-Q); (b) the respective VLC code 111A-Q associated with the respective commissioned luminaire identifier 128A-Q (stored as commissioned luminaire VLC code 129A-Q); and/or (c) the respective RF identifier 112A-Q associated with the respective commissioned luminaire identifier 128A-Q (stored as commissioned luminaire RF identifier 131A-Q). Each commissioned luminaire setting 126A-Q includes a respective set of commissioned location coordinates 127A-Q. The respective set of commissioned location coordinates 127A-Q includes two components: an X location coordinate and a Y location coordinate for each of the commissioned luminaires 110A-Q.

The luminaire node map 125 has multiple commissioned luminaire settings 126A-Q, including a respective commissioned luminaire setting 126A-Q of each commissioned luminaire 110A-Q in the indoor space 105. The luminaire node map 125 also has multiple sets of commissioned location coordinates 127A-Q. Each set of commissioned location coordinates 127A-Q is stored in association with the respective commissioned luminaire setting 126A-Q. A two-dimensional Cartesian coordinate system is used in the example luminaire node map 125 for each of the sets of commissioned location coordinates 127A-Q. However, a three-dimensional coordinate system can be used which includes an additional component along a Z axis for depth or height measurement. For example, if the indoor space 105 is a grocery store it can be advantageous to know whether the mobile device 199 is at floor level or near or at the ceiling level. A grocery store aisle may include several objects of interest, such a cereal boxes stacked on top of various shelves of an aisle, in which case only knowing the X location coordinate and the Y location coordinate is useful, but also knowing the Z location coordinate is even more useful.

Figure 1E:
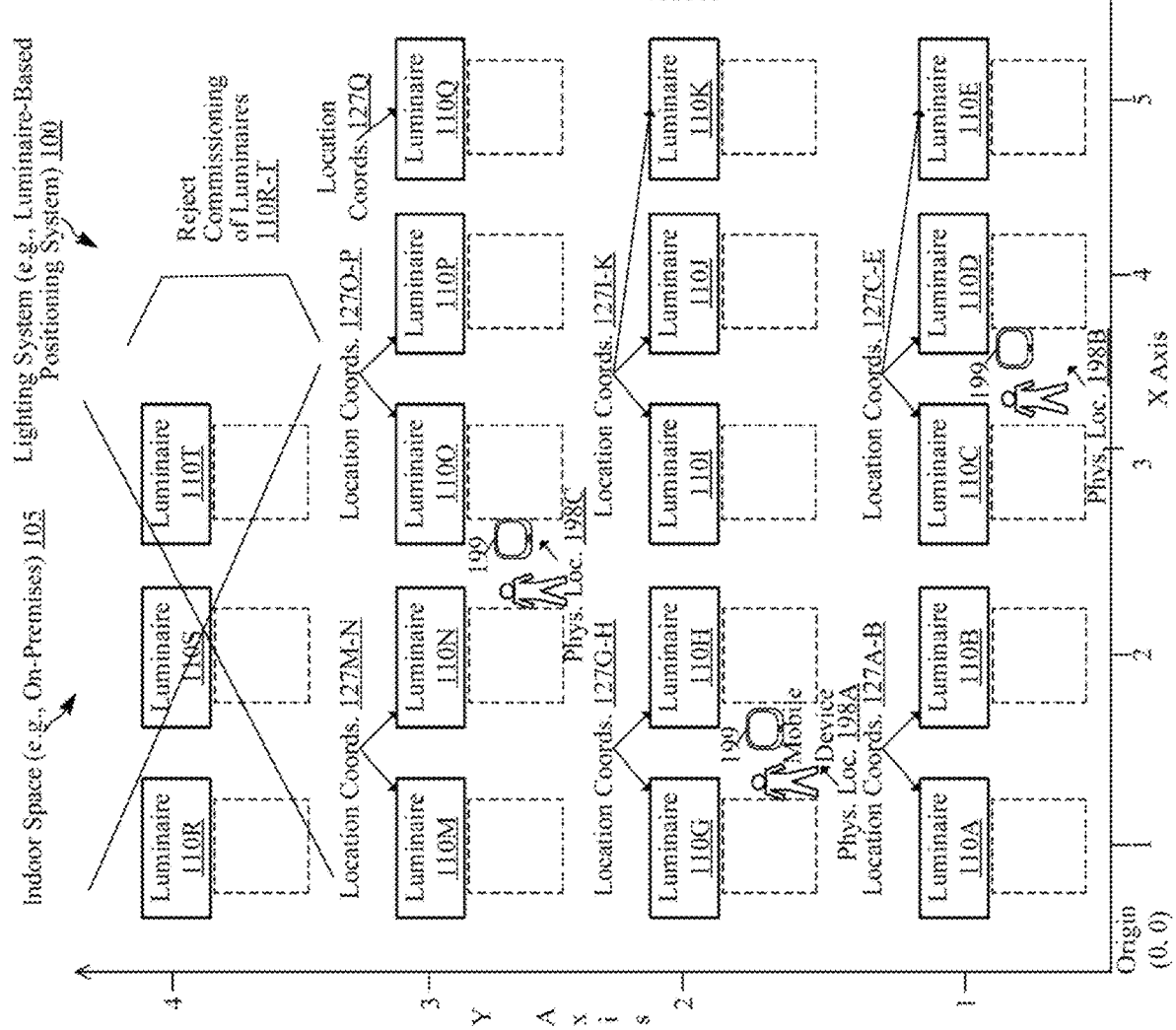
FIG. 1E is a schematic of the lighting system of FIGS. 1A-D that includes a visual layout of commissioned luminaires as represented by a respective set of location coordinates.

FIG. 1E is a schematic of the lighting system 100 of FIGS. 1A-D that includes a visual layout of seventeen commissioned luminaires 110A-Q as represented by a respective set of location coordinates 127A-Q. Commissioning device 180 accepted luminaires 110A-Q for commissioning and rejects luminaires 110R-T in the indoor space 105. As shown, the respective set of location coordinates 127A-Q are located on a two-dimensional Cartesian coordinate system, which includes an X axis for horizontal (e.g., lateral) coordinate position and a Y axis for a vertical coordinate position (e.g., longitudinal). In the example of FIG. 1E, all of the seventeen commissioned luminaires 110A-Q are in an operational state. An X location coordinate component of the respective set of location coordinates 127A-T ranges from 1 to 6 in the example, and the Y location coordinate component of the respective set of location coordinates 127A-Q ranges from 1 to 4. The X location coordinate and the Y location coordinate cover most of the entire floor area of the indoor space 105, but do not identify the height of the luminaire 110A-Z (e.g., a Z axis component). The portion of the indoor space 105 occupied by luminaires 110R-T may not have sufficient coverage for positioning of the mobile device 199 because luminaires 110R-T were rejected for commissioning.

Mobile device 199 of the user 197 (e.g., a human or a robot) can be a smartphone, tablet computer, wearables (e.g., hearing aid, Google Glass, smart watch, or implantables), or laptop/personal computer. In the example of FIGS. 1A-E, luminaires 110A-Q communicate with the mobile device 199 of the user and the gateway 120 to determine a physical location 198 of the user 197 in the indoor space 105. Generally, the luminaire-based positioning system 100 determines an initial position in the indoor space 105, shown as physical location 198, of the mobile device 199 (or a movable asset) based on several received signal strength indicator (RSSI) data communication measurements (e.g., Bluetooth or WiFi) to three or more commissioned luminaires 110A-Q. The farther the mobile device 199 is from the commissioned luminaires 110A-Q, the lower the respective RSSI data communication measurement becomes. Since the set of commissioned location coordinates 127A-Q of the commissioned luminaires 110A-Q are all known, the RSSI measurements are the triangulated and/or trilaterated to calculate the physical location 198A of the mobile device 199 of the user 197 within the indoor space 105.

As shown in the specific example of FIG. 1E, the user travels through the indoor space 105 carrying the mobile device 199 to three different physical locations 198A-C. As the physical location 198A-C of the mobile device 199 changes, different commissioned luminaires 110A-Q are used to take the RSSI measurements. The known sets of commissioned location coordinates 127A-Q of those commissioned luminaires 110A-Q and RSSI measurements are then used to calculate the physical location 198A-C of the mobile device 199 using triangulation and/or trilateration. This is one is just one possible use of a commissioned set of luminaires 110A-Q as RF positioning nodes. The commissioned luminaires could be streetlights in an outdoor space, which are dimmed on or off In some examples, the RF positioning nodes are BLE wireless beacons or other wireless RF devices. For example, this OOB commissioning technique could be used with wireless beacons that are not luminaires, but include a light source 111 and a light modulator 116. As another alternative, the OOB commissioning technique can be used with luminaires, but not in a positioning system, and instead where the physical location coordinates of the luminaires is needed to set up zones for dimming of the lighting system 100.

For the physical location 198A, the RSSI measurements 936A, 936B, 936G, 936H (see FIG. 9) are taken are between the mobile device 199 and commissioned luminaires 110A, 110B, 110G, and 110H and the physical location 198A is triangulated and/or trilaterated to the sets of commissioned location coordinates 127A, 127B, 127G, and 127H. For the physical location 198B, the RSSI measurements 936C, 936D, 936I, 936I (see FIG. 9) taken are between the mobile device 199 and commissioned luminaires 110C, 110D, 110I, and 110J and the physical location 198B is triangulated and/or trilaterated to the sets of commissioned location coordinates 127C, 127D, 127I, and 127J. For the physical location 198C, the RSSI measurements 936H, 936I, 936N, 936O (see FIG. 9) taken are between the mobile device 199 and commissioned luminaires 110H, 110I, 110N, and 110O and the physical location 198C is triangulated and/or trilaterated to the sets of commissioned location coordinates 127H, 127I, 127N, and 127O.

Even if the mobile device 199 is unable to collect RSSI data measurements from three or more luminaires 110A-Q, trilateralization with two luminaires 110 to calculate that the physical position 198 of the mobile device 199 between two ambiguous points is still valuable. Furthermore, even a case where the mobile device 199 is able to collect RSSI data measurements of a single luminaire 110, that is still valuable, as it confirms that the mobile device 199 is within a given radius.

Because the gateway 120 has the luminaire node map 125, the calculation of the physical location 198A-C of the mobile device 199 can be implemented on gateway 120. Thus, the mobile device 199 is in communication with the gateway 120 via the secondary LAN 108 or a local wireless communication network of the RF commissioning network band 106. However, in some examples, if the commissioned luminaires 110A-Q include the luminaire node map 125, then the calculation of the physical location 198A-C of the mobile device 199 can be implemented in the luminaires 110A-Q. In yet another example, the mobile device 199 itself implements the calculation of the physical location 198A-C. For example, the mobile device 199 includes the luminaire node map 125 and the luminaire-based positioning application 950 (see FIG. 9) loaded in memory 940A-B. The luminaire-based positioning application 950 of mobile device 199 is executed by the CPU 930 to calculate the physical location 198A-C of the mobile device 199. In a final example, the mobile device 199 may be in communication with the cloud computing device 166 via the gateway 120, and the cloud computing device 166 calculates the physical location 198A-C of the mobile device 199, which is sent back to the mobile device 199 via the gateway 120 via the secondary LAN 108 or a local wireless communication network of the RF commissioning network band 106.

Although the RSSI measurements are based on radio frequency (RF) waves, in some examples different ranges in the electromagnetic spectrum can be used for positioning of the mobile device 199. Thus alternatively, visible light modulation of the light source 111 of the luminaires 110A-Q, for example, as disclosed in U.S. Pat. No. 9,287,976; titled "Independent Beacon Based Light Position System," issued Mar. 15, 2016 can be used for positioning the mobile device 199. The calculation of the physical location 198A-C in the indoor space 105 using VLC light waves is similar to RF waves—triangulation and/or trilateration of the RSSI measurements between the mobile device 199 to three or more commissioned luminaires 110A-Q whose sets of commissioned location coordinates 127A-W are known is used. For example, the light source 111 may be coupled to the light modulator 116 for visible light communication (VLC). VLC technologies for indoor positioning in the indoor space 105 to determine the position of a mobile device 199 carried by a user 197 are available from Qualcomm Inc. under the trade name Lumicast™.

Figure 2A:
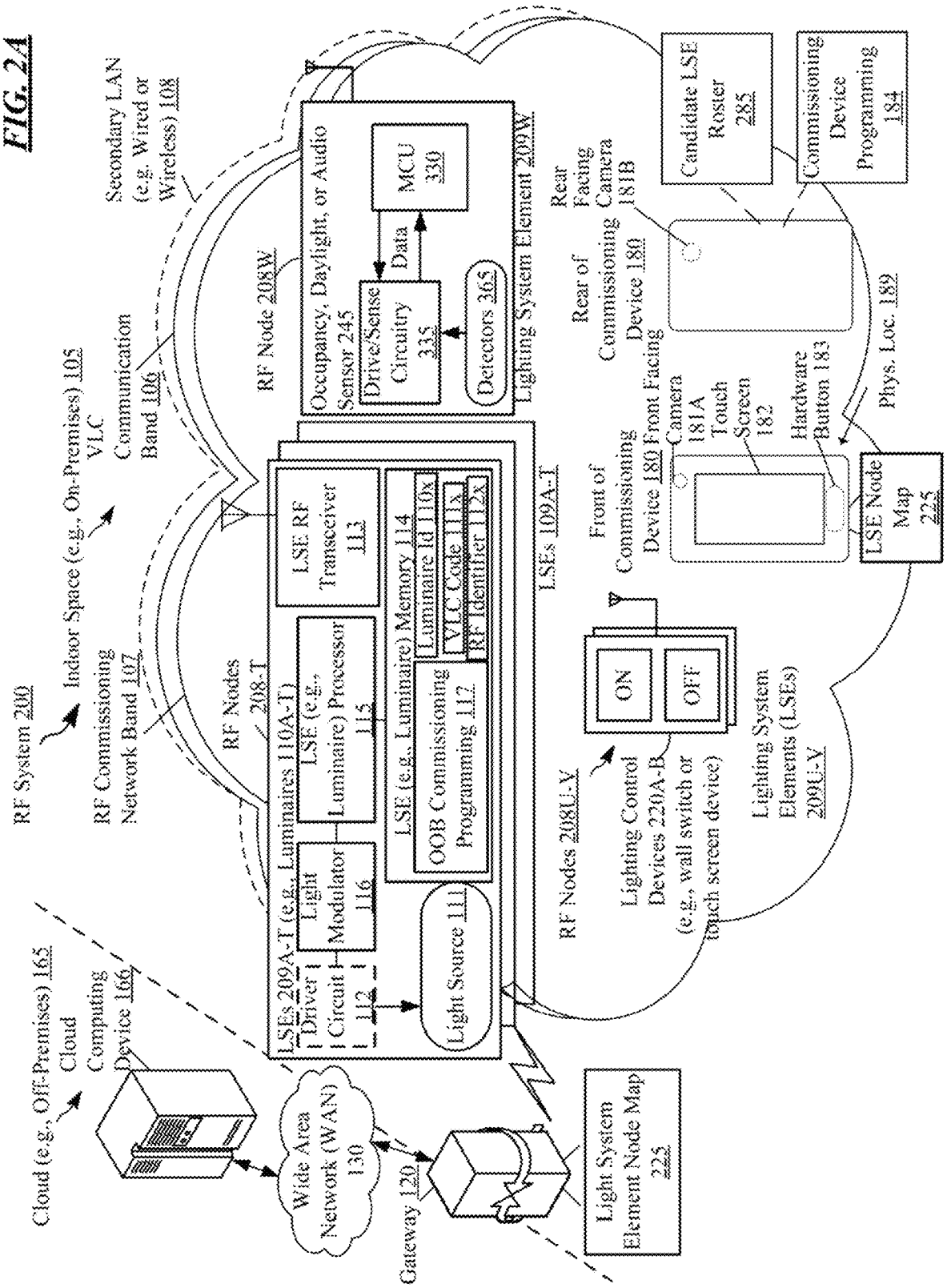
FIG. 2A is a high-level functional block diagram of an example of an RF system of networks and devices that support commissioning of RF nodes of an indoor space.

FIG. 2A is a high-level functional block diagram of an example of an RF system 200 of networks and devices that support commissioning of RF nodes 208A-W of an indoor space 105. RF system 200 can provide a variety of communications in support of determining a physical location 198 of a mobile device 199 of a user 197 and/or an RF asset tag of a movable asset in the indoor space 105. But the commissioning protocols and procedures described herein do not need to be used in a positioning application and can more generally be used to commission the RF devices as RF nodes 208A-Q, 208U-W into a wireless RF communication network of the RF system 200.

As shown in FIG. 2A, the example RF system 200 includes a plurality of RF nodes 208A-W that include lighting system elements (LSEs) 208A-W. LSEs 209A-T are luminaires 110A-T, LSEs 208U-V are lighting control devices (LCDs) 220A-B, and LSE 209W is an occupancy, daylight, or audio sensor 245. RF system 200 does not need to include a lighting system and the RF nodes 208A-W do not need to include lighting system elements 209A-W. For example, RF system 200 can include other types of RF devices seeking to be commissioned as RF nodes into a wireless RF communication network of the RF system 200. As shown, occupancy, daylight, or audio sensor 245 includes a micro-control unit (MCU) 330, drive/sense circuitry 335, and detectors 365, which are described in further detail below.

FIG. 2B is a candidate lighting system element (LSE) roster 285 of the RF system (e.g. lighting system) 200 of FIG. 2A depicted in table format. Twenty (20) candidate LSEs are identified as suitable for commissioning in the space 105, which correspond to LSEs 209A-Q (e.g., luminaires 110A-Q), LSEs 208U-V (e.g., LCDs 220A-B), and LSE 209W (e.g., occupancy, daylight, or audio sensor 245). Candidate luminaire roster 285 includes a plurality of candidate VLC codes 141A-T and a plurality of candidate RF identifiers 142A-T. As shown, a respective candidate VLC code 141A-T is associated with a respective candidate RF identifier 142A-T. Based on the candidate LSE roster 285, the commissioning device 180 accepts commissioning of LSEs 209A-Q, 209U-W in the space 105 and rejects commissioning of LSEs 209R-T in the space 105.

FIG. 2C is the lighting system element (LSE) node map 225 of the RF system 200 of FIGS. 2A-B depicted in a table format. Based on the candidate LSE roster 285 of FIG. 2B, commissioning device 180 accepted each of LSEs 209A-Q, 209U-W for commissioning and rejected each of LSEs 209R-T for commissioning. Thus, each of LSEs 209A-Q and 209U-W are assigned a commissioned LSE position 1-20 ranging from one to twenty, shown as commissioned LSE settings 226A-T, in the LSE node map 225 ranging from one to twenty. The twenty positions cover most of the area of the indoor space 105 for which positioning of the mobile device 199 of the user is 197 is desired. As shown, a respective commissioned LSE setting 226A-T of a respective commissioned LSE 209A-Q, 209U-W includes: (a) a respective LSE identifier 209A-Q, 209U-W of the respective commissioned LSE 209A-Q, 209U-W (stored as commissioned LSE identifier 228A-Q); (b) the respective VLC code 111A-Q, 111U-W associated with the respective commissioned LSE identifier 228A-Q (stored as commissioned LSE VLC code 229A-T); and (c) the respective RF identifier 112A-Q, 112U-W associated with the respective commissioned LSE identifier 228A-Q (stored as commissioned LSE RF identifier 231A-T). Each commissioned LSE setting 226A-T includes a respective set of commissioned location coordinates 127A-Q, 127U-W. The respective set of commissioned location coordinates 127A-Q, 127U-W includes two components: an X location coordinate and a Y location coordinate for each of the commissioned LSEs 209A-Q, 209U-W.

FIG. 2D is a schematic of the RF system 200 of FIGS. 2A-C that includes a visual layout of twenty commissioned lighting system elements (LSEs) 209A-Q, 209U-W as represented by a respective set of location coordinates 127A-Q, 127U-W. Based on the candidate LSE roster 285 of FIG. 2B, commissioning device 180 accepts LSEs 209A-Q, 209U-W for commissioning and rejects LSEs 209R-T for commissioning in the indoor space 105. As shown, the respective set of location coordinates 127A-Q, 127U-W are located on a two-dimensional Cartesian coordinate system, which includes an X axis for horizontal (e.g., lateral) coordinate position and a Y axis for a vertical coordinate position (e.g., longitudinal). In the example of FIG. 2D, all of the twenty commissioned LSEs 209A-Q, 209U-W are in an operational state. An X location coordinate component of the respective set of location coordinates 127A-Q, 127U-W ranges from 1 to 6 in the example, and the Y location coordinate component of the respective set of location coordinates 127A-Q, 127U-W ranges from 1 to 4. The X location coordinate and the Y location coordinate cover most of the entire floor area of the indoor space 105, but do not identify the height of the LSE 209A-Q, 209U-W (e.g., a Z axis component). The portion of the indoor space 105 occupied by LSEs 209R-T does not have sufficient coverage for positioning of the mobile device 199 because LSEs 209R-T were rejected for commissioning.

As shown, the commissioning device 180 travels through the indoor space 105, for example, a human installer travels (e.g., walks) through the indoor space 105 and carries the commissioning device 180. Alternatively, a robot, an unmanned aerial vehicle (UAV), etc. includes (or carries) the commissioning device 180 and travels (e.g., traverses) through the indoor space. At physical location 189A, commissioning device 180 accepts commissioning of LSEs 209A-B (e.g., luminaires 110A-B). The commissioning device 180 takes up position directly below an overhead uncommissioned luminaire 110A, whose RF broadcasts indicate that luminaire 110A is uncommissioned (e.g., not provisioned). VLC and RF signal strength can be used as an indicator of proximity: e.g., if the commissioning device 180 is positioned directly below the uncommissioned luminaire 110A that is part of a planar array of ceiling-mounted luminaires 110A, 110B, 110G, and 110H, then the VLC and RF signals for the VLC code 111A and RF identifier 112A of the uncommissioned luminaire 110A will typically be the strongest that the visible light cameras 181A-B and commissioning device RF transceiver 186 of the commissioning device 180 detect.

At physical location 189B, commissioning device 180 accepts commissioning of LSEs 209G-H (e.g., luminaires 110G-H). At physical location 189C, commissioning device 180 rejects commissioning of LSEs 209T (e.g., luminaire 110T) and accepts commissioning of LSE 209U (LCD 220A). At physical location 189C, commissioning device 180 accepts commissioning of LSEs 209V (e.g., LCD 220B) and accepts commissioning of LSE 209W (e.g., occupancy, daylight, or audio sensor 245).

FIG. 2E is an OOB commissioning protocol 299 procedure for the RF system 200 (e.g. lighting system 200) that is implemented by an uncommissioned RF node 208A and a commissioning device 180 of FIGS. 2A-D and FIGS. 1A-E. In the example of FIG. 2E, the uncommissioned RF node 208A is a respective LSE 209A of the plurality of LSEs 209A-W. The uncommissioned LSEs 209A-W can include: (i) an uncommissioned luminaire 209A-T, (ii) an uncommissioned LCD 209U-V, or (iii) an uncommissioned occupancy, daylight, or audio sensor 245.

In FIG. 2E, at least one of the uncommissioned LSEs 209A includes the luminaire 209A and the luminaire 209A can be ceiling-mounted. However, in another example, at least one of the uncommissioned LSEs 209W includes the uncommissioned occupancy, daylight, or audio sensor 245. In the occupancy, daylight, or audio sensor 245 example, the light modulator 116 may include input/output (I/O) pins that directly drive a light source 111 without a driver circuit 112 for VLC over the VLC communication 107.

Beginning in block S200, uncommissioned RF node 208A, controls an optical wireless communication interface 341 (see FIG. 3), to transmit over a visible light communication (VLC) communication band 107, a VLC code 111A associated with the uncommissioned RF node 208A to a commissioning device 180. The optical wireless communication interface 341 includes light source 111, driver circuit 112, and light modulator 116. For example, the uncommissioned LSE 209A controls the optical wireless communication interface 341 of the uncommissioned LSE 209A, to transmit over the VLC communication band 107, a respective VLC code 111A associated with the respective uncommissioned LSE 209A to the commissioning device 180.

Moving to block S205, uncommissioned RF node 208A transmits, via an RF node transceiver 113 of the uncommissioned RF node 208A, over an RF commissioning network band 106, an RF identifier 112A associated with the uncommissioned RF node 208A to the commissioning device 180. In the LSE type of RF node example, the uncommissioned LSE 209A transmits, via an LSE RF transceiver 113 of the respective uncommissioned LSE 209A, over an RF commissioning network band 106, a respective RF identifier 112A associated with the respective uncommissioned LSE 209A to the commissioning device 180.

Continuing to block S210, commissioning device 180 receives, via an image sensor (e.g., VLC camera or a photodetector) 181 of the commissioning device 180, over the VLC communication band 107, the VLC code 111A of the uncommissioned RF node 208A. Image sensor includes, for example, a front facing visible light camera 181A (e.g., rolling shutter camera), a rear facing visible camera 181, or both. In the LSE type of RF node example, commissioning device 180 receives, via the image sensor 181 of the commissioning device 180, over the VLC communication band 107, the respective VLC code 111A of the respective uncommissioned LSE 209A.

Proceeding to block S215, commissioning device 180 receives, via a commissioning device RF transceiver 186, over the RF commissioning network band 106, the RF identifier 112A of the uncommissioned RF node 208A. In the LSE type of RF node example, in response to receiving the respective VLC code 111A and the respective RF identifier 112A, commissioning device 180 determines whether the respective uncommissioned LSE 209A is in a candidate LSE roster 285 of candidate LSEs suitable for commissioning in a space 105.

Moving to block S220, in response to receiving the VLC code 111A and the RF identifier 112A, commissioning device 180 determines whether the uncommissioned RF node 208A is in a candidate RF node roster 285 of candidate RF nodes suitable for commissioning. Determining whether the uncommissioned RF positioning node 208A is in the candidate RF node roster 285 of candidate RF nodes suitable for commissioning includes comparing the VLC code 111A and the RF identifier 112A with the candidate RF node roster 285 for a match of both a respective candidate VLC code 141A-T and an associated respective candidate RF identifier 142A-T.

In the LSE type of RF node example, commissioning device 180 receives, via a commissioning device RF transceiver 186, over the RF commissioning network band 106, the respective RF identifier 112A of the respective uncommissioned LSE 209A. Determining whether the respective uncommissioned LSE 209A is in the candidate LSE roster 285 of candidate LSEs suitable for commissioning in the space 105 includes: comparing the respective VLC code 111A and the respective RF identifier 112A with the candidate LSE roster 285 for a match of both a respective candidate VLC code 141A-T and an associated respective candidate RF identifier 142A-T.

Finishing in block S225, based on the determination of whether the uncommissioned RF node 208A is in the candidate RF node roster 285, commissioning device 180 accepts or rejects commissioning of the respective uncommissioned RF node 208A. In the LSE type of RF node example, based on the determination of whether the respective uncommissioned LSE 209A is in the candidate LSE roster 285, commissioning device 180 accepts or rejects commissioning of the respective uncommissioned LSE 209A in the space 105.

The OOB commissioning protocol 299 provides advantages that includes enabling relatively long keys, automated communication, verification of physical presence, and enhanced security. With respect to the length of the keys, the VLC code 111$x$ has approximately 2,048 possibilities of address space (e.g., 4 digits) and the RF identifier 112$x$ has 65,536 possibilities of address space. With respect to automated communication, a human installer does not count blinks or read or manually enter displayed keys, which are both slow and error-prone manual processes. Instead, high-speed devices perform all detection and communication of keys. Regarding verification of physical presence, only an RF device physically present in the service space (e.g., indoor space 105) and capable of both VLC and RF communication can be commissioned. Reliance on VLC confirms the on-site presence of a candidate RF device. For enhanced security, encryption can be used as an extra security layer for VLC codes 111A-W (as opposed to, e.g., manual counting of light blinks or reading off displayed numbers, where encryption is too burdensome to be feasible). For example, VLC codes 111A-W can include a key that is seeded via the OOB commissioning protocol 299. RF nodes 208A-W and commissioning device 180 can then implement a key agreement protocol, such as Elliptic Curve Diffie Hellman (ECDH), to derive a shared key. In various examples, multiple numbers may be broadcast by the RF nodes 208A-W via the VLC code 111A-W to enhance security, in other words, there is no restriction to a single number. Since VLC authentication seeks to match both VLC codes 111A-W and RF identifier 112A-W, it greatly increases the difficulty of any attack on the commissioning process and decreases the chance of mistakenly commissioning an unauthorized RF device (e.g., one in storage or actually located in a nearby but distinct service space).

FIG. 3 is a block diagram of RF nodes 208A-T (e.g., lighting system elements 209A-T), specifically luminaires 110A-T, that communicate via the RF system 200 of FIGS. 2A-E and lighting system 100 of FIGS. 1A-E. As shown, luminaires 110A-T include a power supply 305 that is driven by a power source 300. Power source 300 can be a line power source 300A that is the form of electrical power that consumers use when they plug in domestic appliances, televisions and electric lamps into wall outlets. Line power source 300A conveys line power, sometimes referred to as "household power," "household electricity," "house current," "powerline," "domestic power," "wall power," "line power," "AC power," "city power," "street power" that is produced by an electric utility provider. Line power source is referred to as grid power, wall power, and domestic power, alternating current (AC) electric power produced and delivered via AC mains to homes and businesses. Alternatively or additionally, power source 300 can be a non-line power source 300B, such as a battery, solar panel, or any other AC or DC source (e.g., a generator) that is not line powered. Power supply 305 may include a magnetic transformer, electronic transformer, switching converter, rectifier, or any other similar type of circuit to convert an input power signal into a power signal suitable for light source 111 and the other depicted components.

Light source 111 includes electrical-to-optical transducers, such as various light emitters. The emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 111 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

Luminaires 110A-T further include a driver circuit 112, for example, an intelligent light emitting diode (LED) driver circuit. Driver circuit 112 is coupled to light source 111 and drives that light source 111 by regulating the power to light source 111 by providing a constant quantity or power to light source 111 as its electrical properties change with temperature, for example. The driver circuit 112 provides power to light source 111. Driver circuit 112 may be a constant-voltage driver, constant-current driver, or AC LED driver type circuit that provides dimming through a pulse width modulation circuit and may have many channels for separate control of different LEDs or LED arrays that comprise light source 111. An example of a commercially available intelligent LED driver circuit 112 is manufactured by EldoLED®. In the case of luminaire 110A-T, the driver circuit 112 is coupled to the light source 111 to control light source operation of the light source 111.

Driver circuit 112 can further include an AC or DC current source or voltage source, a regulator, an amplifier (such as a linear amplifier or switching amplifier), a buck, boost, or buck/boost converter, or any other similar type of circuit or component. Driver circuit 112 outputs a variable voltage or current to the light source 111 that may include a DC offset, such that its average value is nonzero, and/or an AC voltage. For purposes of communication and control, luminaires 110A-T can each be treated as single addressable device that can be configured to operate as a member of one or more lighting control groups or zones. The luminaires 110A-T can be line powered and remain operational as long as power is available.

Luminaires 110A-T include power distribution circuitry 325 driven by the power source 300, an LSE (e.g., luminaire) processor 115, and an LSE (e.g., luminaire) memory 114. As shown, luminaire processor 115 is coupled to an LSE (e.g., luminaire) multi-band communication interface system 340 and driver circuit 112. Luminaire processor 114 includes a central processing unit (CPU) that controls the light source operation of the light source 111. Luminaire memory 114, commissioning device memory 187, and other memories described herein can include volatile and non-volatile storage.

Luminaires 110A-T include power distribution circuitry 325, a micro-control unit (MCU) 330, optional drive/sense circuitry 335, and optional detector(s) 365. As shown, MCU 330 is coupled to driver circuit 112 and controls the light source operation of the light source 111. MCU 330 includes a luminaire memory 114 (volatile and non-volatile) and a luminaire processor 115 (CPU). The luminaire memory 114 includes the OOB commissioning programming 117 for OOB commissioning and the depicted data of a respective luminaire identifier (id) 110A-T, a respective VLC code 111A-T, and a respective RF identifier 112A-T. Luminaires 110A-T include additional programming logic in the luminaire memory 114 for lighting control operation, positioning, maintenance, and diagnostic operations, for example.

Drive/sense circuitry 335 and detectors 365 are optionally on-board the luminaires 110A-T. Detectors 365 can be an occupancy sensor (e.g., infrared sensors or camera for occupancy or motion detection), an in-fixture daylight sensor, an audio sensor, a temperature sensor, or other environmental sensor. Drive/sense circuitry 335, such as application firmware, drives the occupancy, audio, and photo sensor hardware. Drive/sense circuitry 335 of luminaires 110A-T detects state changes in the detector(s) 365, such as occupancy, daylight, and audio sensors.

The power distribution circuitry 325 distributes power and ground voltages to the MCU 330 (e.g., including the luminaire processor 115 and luminaire memory 114) multi-band communication interface system 340, drive/sense circuitry 335, and detector(s) 365 to provide reliable operation of the various circuitry on the luminaires 110A-T.

As shown, luminaires 110A-T include the multi-band communication interface system 340, which includes at least one luminaire RF transceiver 113 (e.g., wireless RF network communication interface), for example, a single band, dual-band, or tri-band chipset of wireless transceiver(s) 113A-B configured for wireless communication via separate radios that operate at three different frequencies, such as sub-GHz (e.g., 900 MHz), Bluetooth Low Energy (BLE) (2.4 GHz), and 5 GHz, for example. For example, multi-band communication interface system 340 includes two wireless network communication interfaces 113A-B, shown as LSE (e.g., luminaire) RF transceivers (XCVRs) 113A-B. In our example, luminaire multi-band communication interface system 340 has a radio set that includes a first luminaire RF transceiver 113A configured for short-range wireless communication over an RF commissioning network band 106, such as 1 GHz or above communications (e.g., 2.4 GHz for Bluetooth) for commissioning purposes. The first luminaire RF transceiver 113A transmits the respective RF identifier 112A-T over the RF commissioning network band 106. Multi-band communication interface system 340 can further include a second luminaire RF transceiver (e.g., radio) 113B configured for wireless communication (e.g., unicast and multicast) via a wireless lighting control network, such as secondary LAN 108, over a wireless lighting control network communication band, such as sub-GHz (e.g., 900 MHz for WiFi) for lighting control and systems operations (or information). Transport layer methods ride on the network layer function of the transceivers 113A-B. The second luminaire RF transceiver 113B is optional.

The term multi-band is used because in addition the at least one RF transceiver 113$x$, the luminaire multi-band communication interface system 340 includes a luminaire optical wireless communication interface 341. Luminaire optical wireless communication interface 341 includes light source 111, driver circuit 112, and light modulator 116 to transmit data over the VLC communication band 107. Luminaire optical wireless communication interface 341 transmits the respective VLC code 111A-T. Luminaire optical wireless communication interface 341 can also optionally include an image sensor, such as a VLC camera 181 to receive data over the VLC communication band 107. It should be understood that "multi-band" means communications over the RF commissioning network band 106 and the VLC communication band 107. The communication over the two separate bands 106, 107 can occur simultaneously (concurrently); however, it should be understood that the communication over the two separate RF bands may not actually occur simultaneously. As further shown, luminaires 110A-T can communicate over an optional secondary network 108 (e.g., wired or wireless LAN) via the luminaire RF transceiver 113B, such as a backhaul network for communication between the luminaires 110A-T, commissioning device 180, and the gateway 120. As further shown, luminaires 110A-T can include an optional wired network communication interface 316 for communication over the secondary LAN 108.

LSE (e.g., luminaire) processor 115 of the luminaires 110A-T, commissioning device processor 188, gateway processor 523 of gateway 120, and cloud computing device memory 168 of cloud computing device (CCD) 166, processor 930, processors of other RF nodes 208U-W (e.g., lighting system elements 209U-W), and processor 930 of mobile device 199 described herein serve to perform various operations, for example, in accordance with instructions or programming executable by processors 115, 188, 523, 668, 930. For example, such operations may include operations related to communications with the commissioning device 180 during the commissioning protocol 299 procedure described herein. Although a processor 115, 188, 523, 668, 930 may be configured by use of hardwired logic, typical processors are general processing circuits configured by execution of programming. Processors 115, 188, 523, 668, 930 include elements structured and arranged to perform one or more processing functions, typically various data processing functions. Although discrete logic components could be used, the examples utilize components forming a programmable CPU. A processor 115, 188, 523, 668, 930 for example includes one or more integrated circuit (IC) chips incorporating the electronic elements to perform the functions of central processing unit (CPU).

By way of example a microprocessor (μP), although other processor hardware may serve as the CPU. The CPU and memories, for example, may be implemented by a suitable system-on-a-chip (SOC) often referred to as a micro-control unit (MCU) 530 or multiple SOCs (e.g., MCUs). In a microprocessor implementation, the processors 115, 188, 523, 668, 930 for example, may be based on any known or available microprocessor architecture, such as a Reduced Instruction Set Computing (RISC) using an ARM architecture, as commonly used today in servers, personal computing devices, mobile devices and other portable electronic devices. Of course, other processor circuitry may be used to form the CPU or processor hardware in luminaires 110A-T, commissioning device 180, gateway 120, cloud computing device 166, other RF nodes 208U-W (e.g., lighting system elements 209U-W), and mobile device 199 described herein. Although the illustrated examples of gateway processor 523, cloud computing device processor 568, and luminaire processor 115 include only one microprocessor, for convenience, a multi-processor architecture can also be used. It should be noted that a digital signal processor (DSP) or field-programmable gate array (FPGA) could be suitable replacements for the processors 115, 188, 523, 668, 930.

LSE (e.g., luminaire) memory 114 of the luminaires 110A-T, commissioning device memory 187 of commissioning device 180, gateway memory 524 of gateway 120, CCD memory 668 of CCD 166, memory of other RF nodes 208U-W (e.g., lighting system elements 209U-W), and memory 940A-B of mobile device 199 are for storing data and programming. In the example, the main memory system 114, 187, 524, 668, 940A-B may include a flash memory (non-volatile or persistent storage), a read-only memory (ROM), and a random access memory (RAM) (volatile storage). The RAM serves as short term storage for instructions and data being handled by the processors 115, 188, 523, 668, 930 e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions, programming, or application(s) may be software or firmware used to implement any other device functions associated with luminaires 110A-T, commissioning device 180, gateway 120, cloud computing device 166, other RF nodes 208U-W (e.g., lighting system elements 209U-W), and mobile device 199. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 114, 187, 524, 668, 940A-B, or a memory of a computer used to download or otherwise install such programming into the luminaires 110A-T, commissioning device 180, gateway 120, cloud computing device 166, other RF nodes 208U-W (e.g., lighting system elements 209U-W), and mobile device 199 or a transportable storage device or a communications medium for carrying program for installation in the luminaires 110A-T, commissioning device 180, gateway 120, cloud computing device 166, other RF nodes 208U-W (e.g., lighting system elements 209U-W), and mobile device 199.

Figure 4:
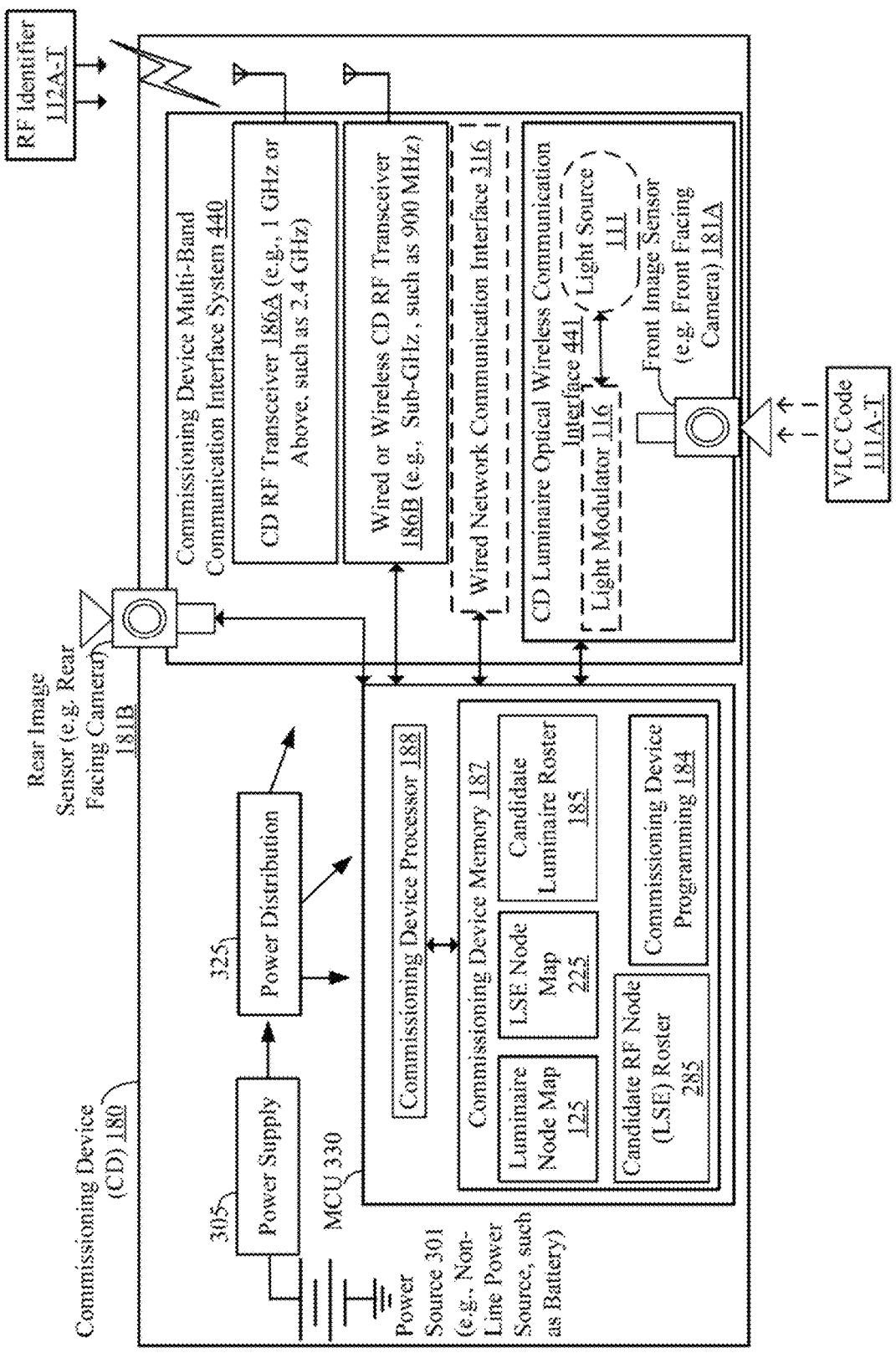
FIG. 4 is a block diagram of the commissioning device for use in RF node commissioning, for example, in the RF system of FIGS. 2A-E and lighting system of FIGS. 1A-E.

FIG. 4 is a block diagram of the commissioning device 180 for use in RF node commissioning, for example, in the RF system 200 of FIGS. 2A-E and lighting system 100 of FIGS. 1A-E. As shown, the commissioning device 180 includes a power source (e.g., non-line power source, such as a battery), power supply 325, and MCU 330. MCU 330 includes the commissioning device processor 188 and commissioning device memory 187. The circuitry, hardware, and software of the commissioning device 180 shown is similar to the luminaires 110A-T of FIG. 2. However, as shown, the commissioning device memory 187 includes the luminaire node map 125, LSE node map 225, candidate luminaire roster 185, and candidate RF node (e.g., candidate LSE) roster 285, and commissioning device programming 184.

Commissioning device 180 includes a commissioning device (CD) multi-band communication interface system 440, which is similar to the luminaire multi-band communication interface system 340. However, the CD multi-band communication interface system 440 further includes both a front image sensor (e.g., front facing camera 181A) and a rear image sensor (e.g., rear facing camera 181B). The CD multi-band communication interface system 440 includes two wireless network communication interfaces 113A-B, shown as luminaire RF transceivers (XCVRs or radio) 113A-B. In our example, CD multi-band communication interface system 440 has a radio set that includes a first CD RF transceiver (e.g., radio) 186A configured for short-range wireless communication over an RF commissioning network band 106, such as 1 GHz or above communications (e.g., 2.4 GHz for Bluetooth) for commissioning purposes. The first CD RF transceiver 186A receives the respective RF identifier 112A-T. CD multi-band communication interface system 440 can further include a second CD RF transceiver (e.g., radio) 186B configured for wireless communication over: (a) a local area network (LAN) 106, 108 to a gateway, or (b) a wide area network (WAN) 130 to a cloud computing device 166. For example, the second CD RF transceiver 186B is configured for wireless communication (e.g., unicast and multicast) via a wireless lighting control network, such as secondary LAN 108, over a wireless lighting control network communication band, such as sub-GHz (e.g., 900 MHz for WiFi) for lighting control and systems operations (or information) with gateway 120 and cloud computing device 166, for example. Transport layer methods ride on the network layer function of the transceivers 186A-B. The second CD RF transceiver 186B is optional, for example, communication with the gateway 120 can occur via the first CD RF transceiver 186A.

The term multi-band is used because in addition the at least one RF transceiver 186A, the CD multi-band communication interface system 440 includes a CD optical wireless communication interface 441. CD optical wireless communication interface 441 includes image sensors, such as visible light cameras 181A-B, to receive data over the VLC communication band 107. CD optical wireless communication interface 441 receives the respective VLC code 111A-T. CD optical wireless communication interface 441 can optionally include light source 111, driver circuit 112, and light modulator 116 to transmit data over the VLC communication band 107. As further shown, commissioning device 180 can include an optional wired network communication interface 316 for communication over the secondary LAN 108 with gateway 120 or cloud computing device 166.

Execution of the commissioning device programming 184 by the commissioning device processor 188 configures the commissioning device 180 to implement the following functions. In response to accepting commissioning of the respective uncommissioned luminaire 110A-T in the indoor space 105, commissioning device 180 commissions the respective uncommissioned luminaire 110A-Q as a full-fledged RF node in the indoor space 105. The function to commission the respective uncommissioned luminaire 110A-Q in the indoor space 105 includes to: update the luminaire node map 125 to include a respective commissioned luminaire setting 126A-Q of the respective uncommissioned luminaire 126A-Q. The respective commissioned luminaire setting 126A-Q stores: (i) the respective luminaire identifier 110A-Q of the respective uncommissioned luminaire 110A-Q as the respective commissioned luminaire identifier 128A-Q; (ii) the respective VLC code 111A-Q associated with the respective uncommissioned luminaire identifier 110A-Q as the respective commissioned VLC code 129A-Q; and/or (iii) the respective RF identifier 112A-Q associated with the respective uncommissioned luminaire identifier 110A-Q as the respective commissioned luminaire RF identifier 131A-Q.

As noted above, the second commissioning device RF transceiver 186B is configured for wireless communication over: (a) a local area network (LAN) 108 to a gateway 120, or (b) a wide area network (WAN) 130 to a cloud computing device 166. Execution of the commissioning device programming 184 by the commissioning device processor 188 configures the commissioning device 180 to transmit the updated luminaire node map 125, via the second commissioning device RF transceiver 186B over: (a) the LAN 108 to the gateway 120, or (b) the WAN 130 to the cloud computing device (CCD) 166.

Alternatively, the gateway 120 or CCD 166 updates the luminaire node map 125. The function to determine whether the respective uncommissioned luminaire 110A-T is in the candidate luminaire roster 185 of candidate luminaires suitable for commissioning in the indoor space 105 includes the following functions. Commissioning device 180 transmits the respective VLC code 111A-T and the respective RF identifier 112A-T, via the second commissioning device RF transceiver 186B, over: (a) the LAN 108 to the gateway 120, or (b) the WAN 130 to the CCD 166. Commissioning device 180 receives the determination of whether the respective uncommissioned luminaire 110A-T is in the candidate luminaire roster 185 of candidate luminaires suitable for commissioning in the indoor space 105, via the second commissioning device RF transceiver 186B, over: (a) the LAN 108 from the gateway 120, or (b) the WAN 130 from the CCD 166.

Figure 5:
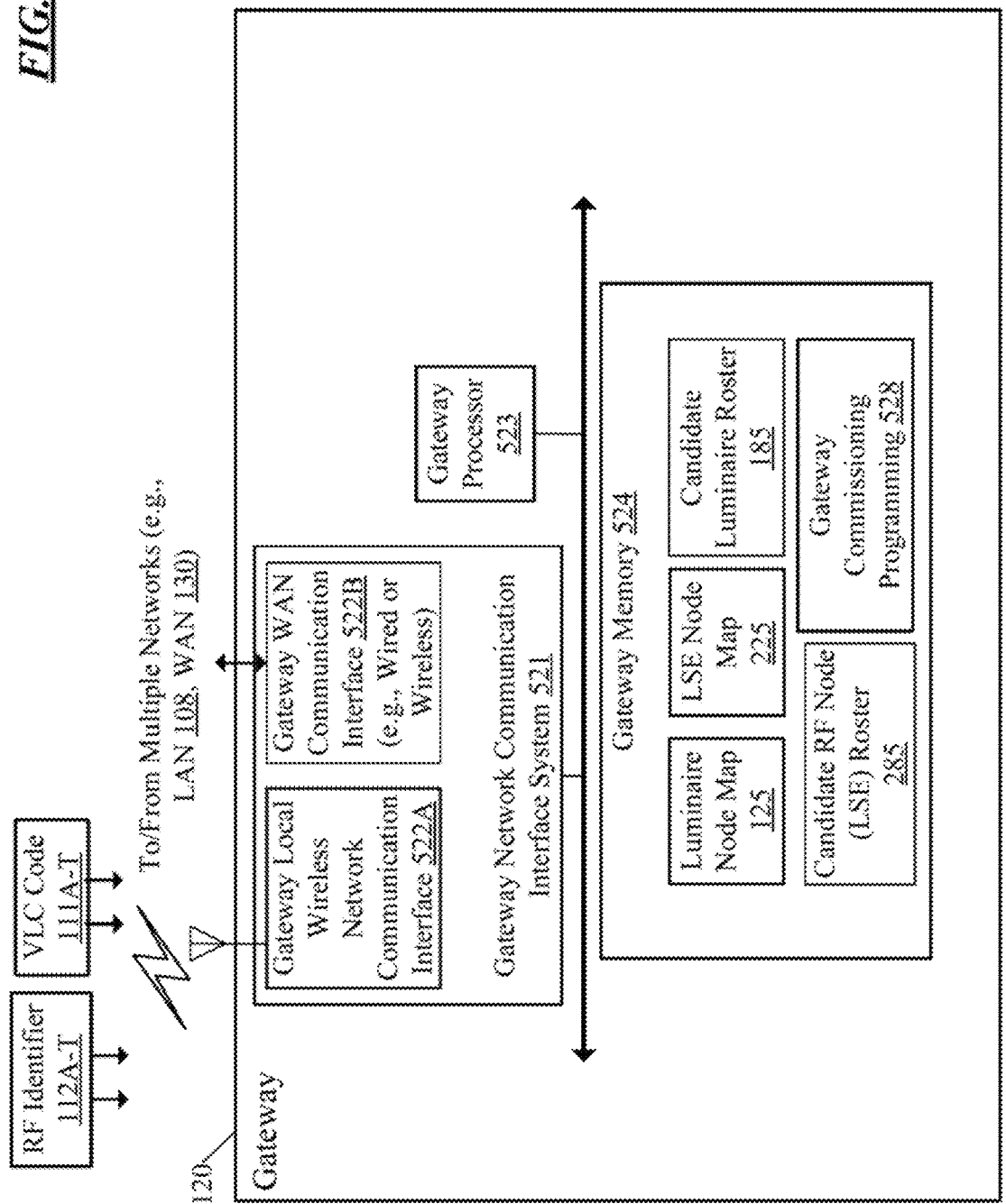
FIG. 5 is a block diagram of a gateway that communicates via the lighting system of FIGS. 1A-E and RF system of FIGS. 2A-E.

FIG. 5 is a block diagram of a gateway 120 that communicates via the lighting system 100 of FIGS. 1A-E and RF system 200 of FIGS. 2A-E. As shown in FIG. 5, the gateway 120 includes a gateway network communication interface system 521 including a gateway local wireless network communication interface 522A configured for wireless communication over the secondary local area network (LAN) 108, which can be via wired or wireless (e.g., RF) communication. Alternatively or additionally, gateway local wireless network communication interface 522A can be for wireless communication over the local wireless communication network RF of the commissioning network band 106, e.g., with the commissioning device 180 and RF nodes 208A-W (e.g., LSEs 209A-W, such as luminaires 110A-T).

Figure 6:
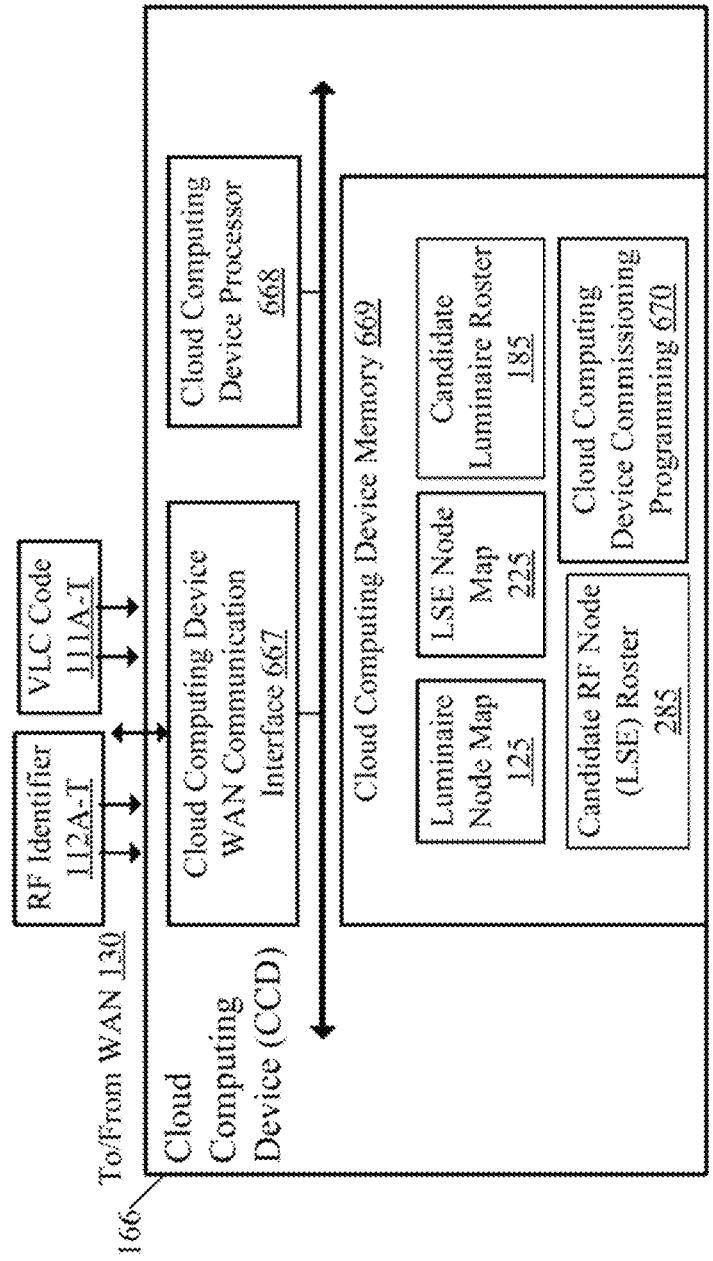
FIG. 6 is a block diagram of a cloud computing device 166 that communicates via the lighting system of FIGS. 1A-E and RF system of FIGS. 2A-E.

Gateway memory 524 of FIG. 5, cloud computing device memory 669 of FIG. 6, and luminaire memory 114, and commissioning device memory 187 each include memories/storage, such as a random access memory and/or a read-only memory to store data, as well as programs stored in one or more of the memories/storage.

Gateway network communication interface system 121 further includes a gateway WAN communication interface 522B for communication over the WAN 130 to the cloud computing device 166. Gateway WAN communication interface 522B can be wired (e.g., Ethernet) or wireless, such as cellular data, for example. The gateway 120 further includes a gateway memory 524, a gateway processor 523 coupled to the gateway network communication interface system 521 and the gateway memory 524.

As shown in FIG. 5, the gateway memory 524 can, for example, store the luminaire node map 125, LSE node map 225, candidate luminaire roster 185, and candidate RF node (e.g., candidate LSE) roster 285. Gateway memory 124 also stores gateway commissioning programming 528. Continuing the example from FIG. 4 above, assume that the commissioning device 180 transmits the updated luminaire node map 125, via the second commissioning device RF transceiver 186B over the LAN 108 to the gateway 120. In this example where the commissioning device 180 updates the luminaire node map 125, execution of the gateway commissioning programming 528 by the gateway processor 523 configures the gateway 120 to implement the following functions. Gateway 120 receives, via the gateway local wireless network communication interface 522A, over the LAN 108, the updated luminaire node map 125 from the commissioning device 180.

Alternatively, the gateway 120 itself updates the luminaire node map 125. Execution of the commissioning device programming 184 by the commissioning device processor 188 configures the commissioning device 180 to implement functions to transmit the respective VLC code 111A-T and the respective RF identifier 112A-T, via the second commissioning device RF transceiver 186B over the LAN 108 to the gateway 120. Execution of the gateway commissioning programming 528 by the gateway processor 523 configures the gateway 120 to implement the following functions. Gateway 120 receives, via the gateway local wireless network communication interface 522A, over the LAN 108, the respective VLC code 111A-T and the respective RF identifier 112A-T from the commissioning device 180. Gateway 120 compares the respective VLC code 111A-T and the respective RF identifier 112A-T with the candidate luminaire roster 185 for a match of both the respective candidate VLC code 141A-Q and the associated respective candidate RF identifier 142A-Q. Gateway 120 determines that the respective uncommissioned luminaire 110A-Q is in the candidate luminaire roster 185 of candidate luminaires suitable for commissioning in the indoor space 105. Based on the determination that the respective uncommissioned luminaire 110A-Q is in the candidate luminaire roster 185, gateway 120 accepts commissioning of the respective uncommissioned luminaire 110A-Q in the indoor space 105. Commissioning device 180 receives the determination of whether the respective uncommissioned luminaire 110A-T is in the candidate luminaire roster 185 of candidate luminaires suitable for commissioning in the indoor space 105, via the second commissioning device RF transceiver 186B, over the LAN 108 from the gateway 120.

In response to accepting commissioning of the respective uncommissioned luminaire 110A-T in the indoor space 105, gateway 120 commissions the respective uncommissioned luminaire 110A-Q in the indoor space 105. The function to commission the respective uncommissioned luminaire 110A-Q in the indoor space 105 includes to: update the luminaire node map 125 to include a respective commissioned luminaire setting 126A-Q of the respective uncommissioned luminaire 126A-Q. The respective commissioned luminaire setting 126A-Q stores: (i) the respective luminaire identifier 110A-Q of the respective uncommissioned luminaire 110A-Q as the respective commissioned luminaire identifier 128A-Q; (ii) the respective VLC code 111A-Q associated with the respective uncommissioned luminaire identifier 110A-Q as the respective commissioned VLC code 129A-Q; and/or (iii) the respective RF identifier 112A-Q associated with the respective uncommissioned luminaire identifier 110A-Q as the respective commissioned luminaire RF identifier 131A-Q. Gateway 120 transmits, the updated luminaire node map 125, via the gateway WAN communication interface 522B over the WAN 130 to the cloud computing device 166.

FIG. 6 is a block diagram of a cloud computing device (CCD) 166 that communicates via the lighting system 100 of FIGS. 1A-E and RF system 200 of FIGS. 2A-E. As shown in FIG. 6, the CCD 166 includes a CCD wide area network (WAN) communication interface configured 667 for communication over a WAN 130 with the gateway 120. The CCD 166 further includes a CCD memory 669 and a CCD processor 668 coupled to the CCD WAN communication interface 667 and the CCD memory 669. The CCD 166 further includes CCD commissioning programming 670 in the CCD memory 169.

As shown in FIG. 6, the CCD memory 669 can, for example, store the luminaire node map 125, LSE node map 225, candidate luminaire roster 185, and candidate RF node (e.g., candidate LSE) roster 285. CCD memory 669 also stores CCD commissioning programming 670. Continuing the example from FIG. 5 above, assume that the gateway 120 transmits the updated luminaire node map 125, via the gateway WAN communication interface 522B over the WAN 130 to the CCD 166. In this example where the gateway 120 updates the luminaire node map 125, execution of the CCD commissioning programming 670 by the CCD processor 668 configures the CCD 166 to implement the following functions. CCD 168 receives the updated luminaire node map 125, via the CCD WAN communication interface 667 over the WAN 130, from the gateway 120. In response to receiving the updated luminaire node map 125 from the gateway 120, CCD 166 stores the updated luminaire node map 125.

Figure 7:
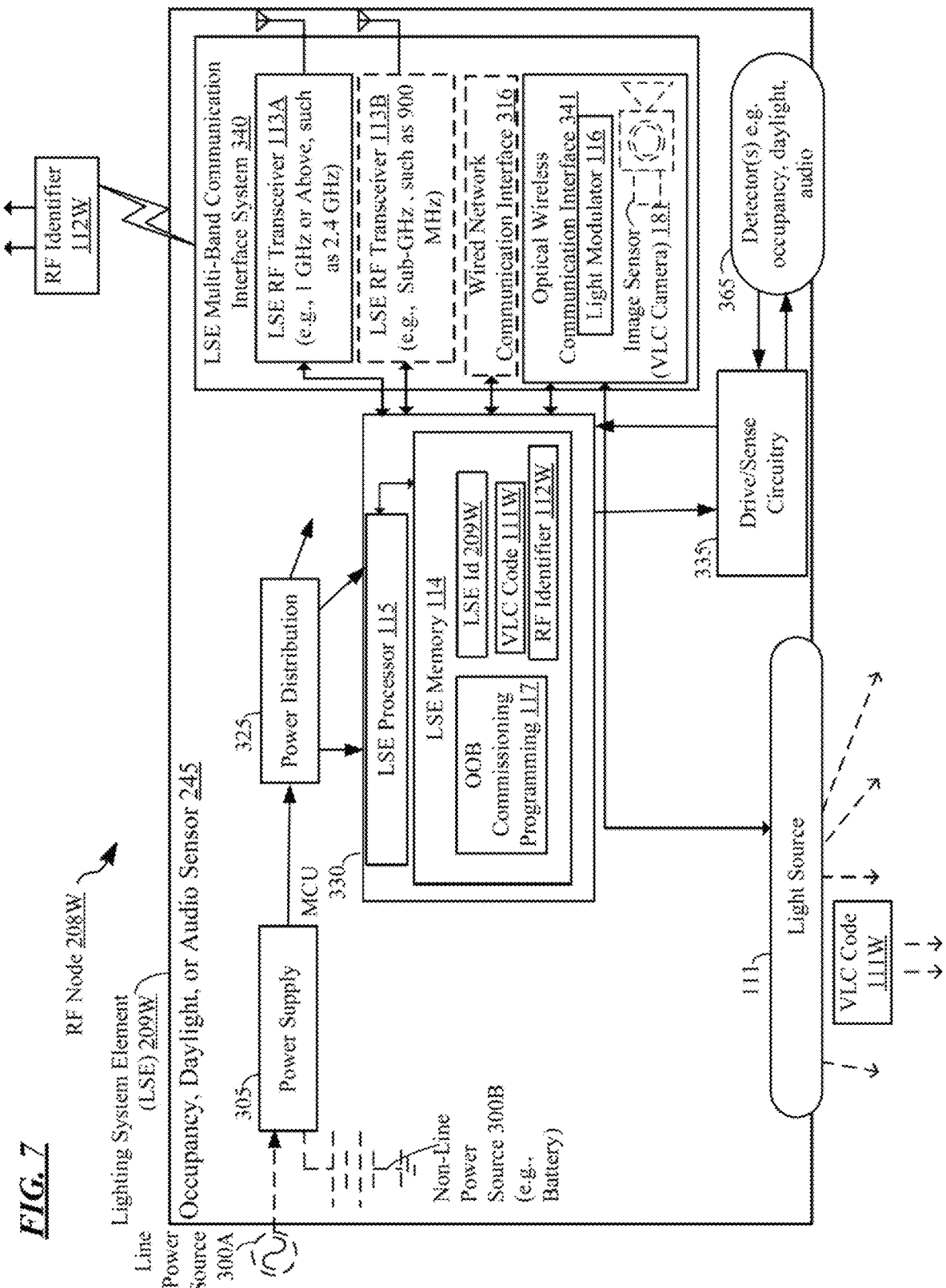
FIG. 7 is a block diagram of an RF node, more specifically LSE, which is an occupancy, daylight, or audio sensor that is commissioned in the RF system of FIGS. 2A-E.

FIG. 7 is a block diagram of RF node 208W, more specifically LSE 209W, which is an occupancy, daylight, or audio sensor 245 that is commissioned in the RF system 200 of FIGS. 2A-E. The circuitry, hardware, and software of the occupancy, daylight, or audio sensor 245 shown is similar to the luminaires 110A-T of FIG. 3, including LSE multi-band communication interface system 340 and MCU 330 to implement the OOB commissioning techniques, such as OOB commissioning protocol 299, described herein. As shown, MCU 330 includes LSE memory 114 and LSE processor 115. LSE memory 114 includes OOB commissioning programming 117 for OOB commissioning and the depicted data of a respective LSE identifier (id) 209W, a respective VLC code 111W, and a respective RF identifier 112W.

Figure 8A:
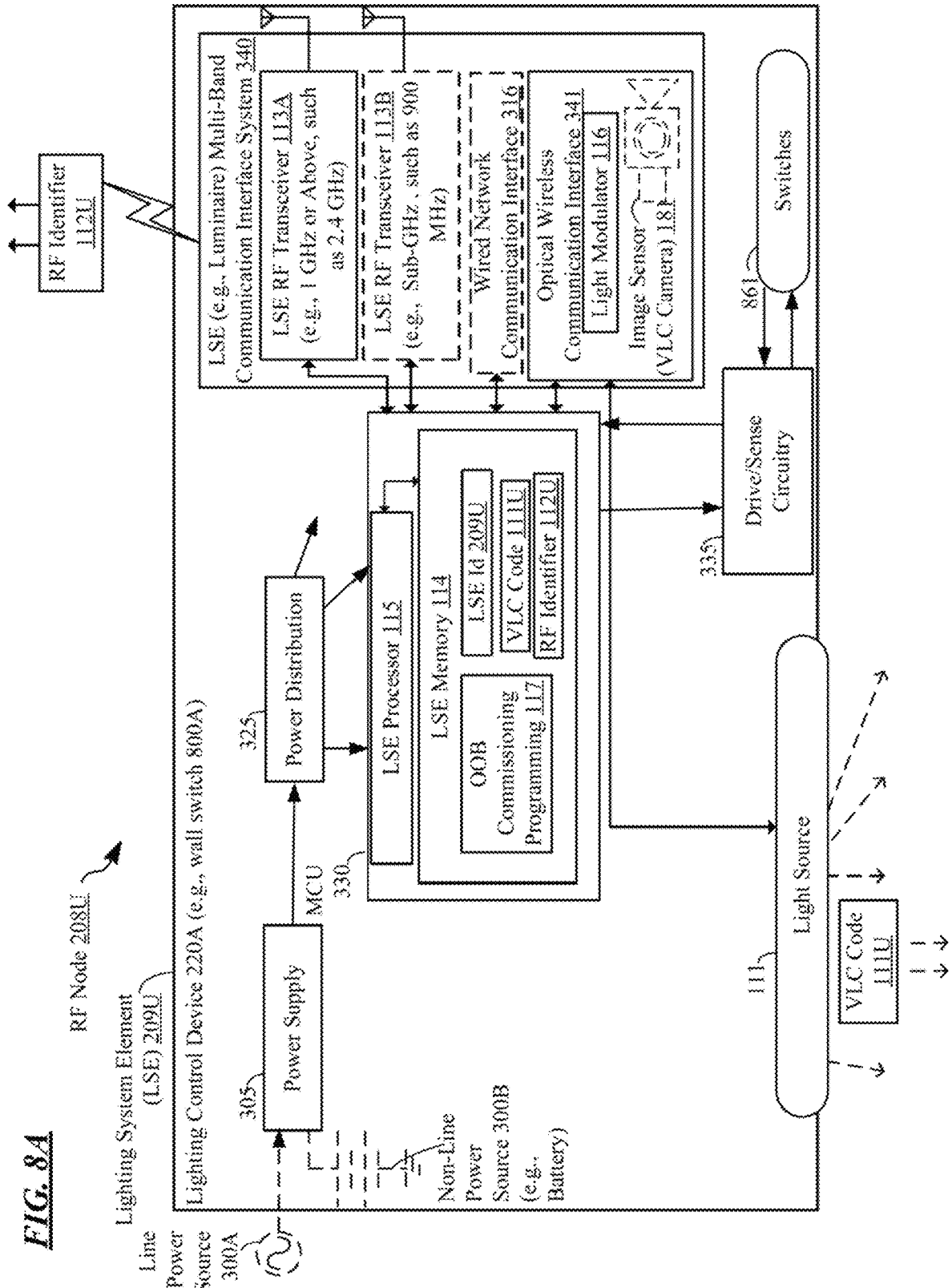
FIGS. 8A-B are block diagrams of RF nodes (e.g., lighting control devices), specifically a wall switch and a touch screen device that are commissioned in the RF system of FIGS. 2A-E.
Figure 8B:
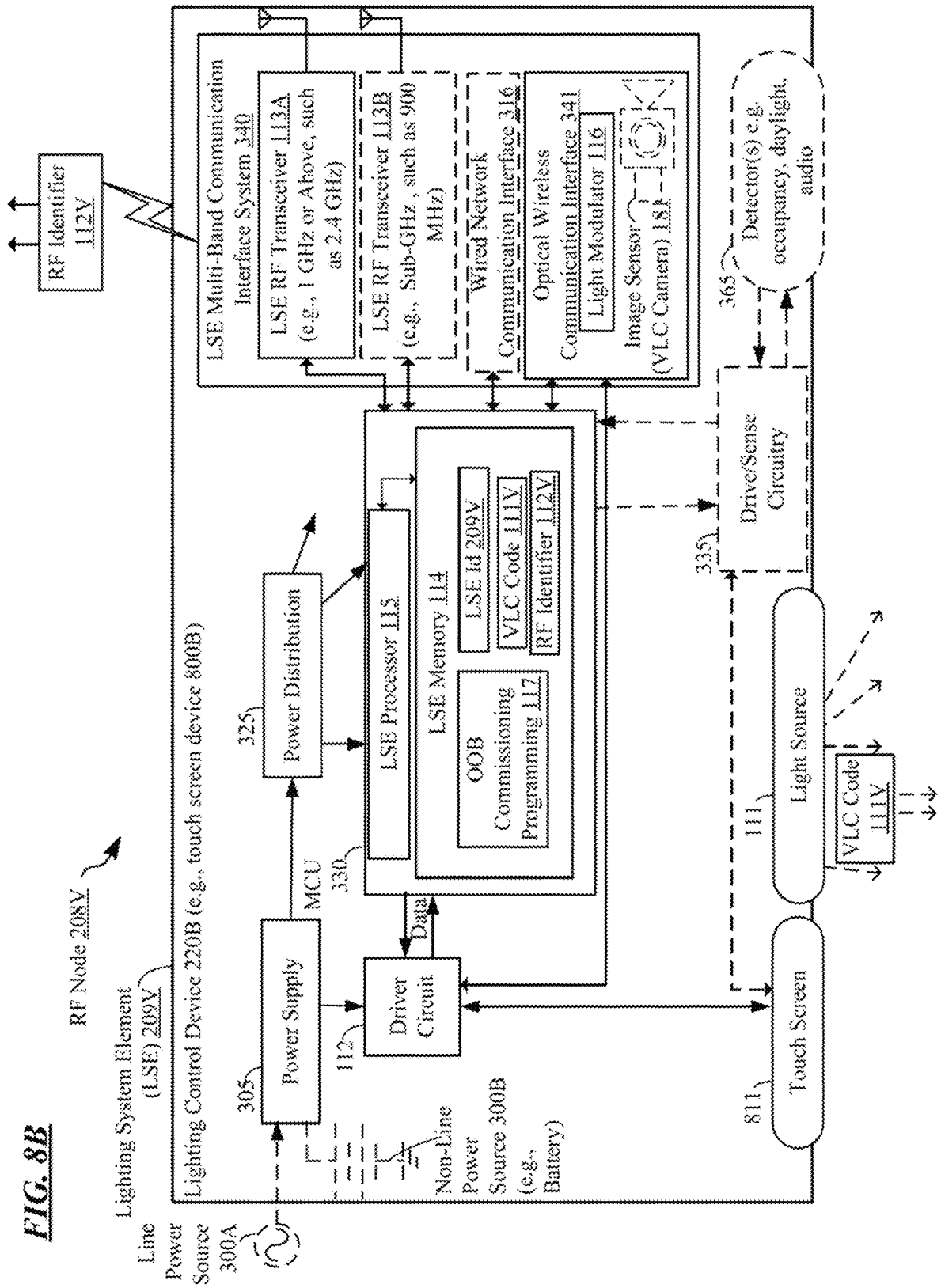

FIGS. 8A-B are block diagrams of RF nodes 208U-V (e.g., lighting control devices 209U-V), specifically a wall switch 800A and a touch screen device 800B that are commissioned in the RF system 200 of FIGS. 2A-E. The circuitry, hardware, and software of the LCDs 209U-V shown are similar to the luminaires 110A-T of FIG. 3, including LSE multi-band communication interface system 340 and MCU 330 to implement the OOB commissioning techniques, such as OOB commissioning protocol 299, described herein. As shown, MCU 330 includes LSE memory 114 and LSE processor 115. LSE memory 114 includes OOB commissioning programming 117 for OOB commissioning and the depicted data of a respective LSE identifier (id) 209U-V, a respective VLC code 111U-V, and a respective RF identifier 112U-V.

However, as shown, wall switch 800A and touchscreen device 800B can include a subset of the circuitry, hardware, and software shown for the luminaires 110A-T of FIG. 3. As shown in FIG. 8A, LCD 220A can be a wall switch 800A where the drive/sense circuitry 255 responds to switches 861. Switches 861 can be an on/off switch, dimmer switch, or set scene switch based on Acuity Brands Lighting's commercially available xPoint® Wireless ES7 product. In some examples, wall switch 800A includes a single shared button switch 861 for on/off, dimming, or set scene functions and a pilot light source indicator (not shown) of wall switch 800A. A button station can include various button settings that can have the lighting control settings adjusted, for example, four buttons can be arranged with two longitudinal buttons (north-south) and two lateral buttons (east-west).

In FIG. 8B, LCD 220B can be a touchscreen device 800B where lighting control setting adjustments are inputted via a user interface application (not shown) through manipulation or gestures on a touch screen 811. For output purposes, the touch screen 811 includes a display screen, such as a liquid crystal display (LCD) or light emitting diode (LED) screen or the like. For input purposes, touch screen 811 includes a plurality of touch sensors.

A keypad may be implemented in hardware as a physical keyboard of touch screen device 800B, and keys may correspond to hardware keys of such a keyboard. Alternatively, some or all of the keys (and keyboard) of touchscreen device 800B may be implemented as "soft keys" of a virtual keyboard graphically represented in an appropriate arrangement via touch screen 811. The soft keys presented on the touch screen 811 may allow the user of touchscreen device 800B to invoke the same user interface functions as with the physical hardware keys.

Optionally drive/sense circuitry 335 is coupled to touch sensors of touch screen 811 for detecting the occurrence and relative location/position of each touch with respect to a content display area of touch screen 811. In this example, drive/sense circuitry 335 is configured to provide LSE processor 115 with touch-position information based on user input received via touch sensors. In some implementations, LSE processor 115 is configured to correlate the touch position information to specific content being displayed within the content display area on touch screen 811. The touch-position information captured by the drive/sense circuitry 335 and provided to LSE processor 115 may include, but is not limited to, coordinates identifying the location of each detected touch with respect to the display area of touch screen 811 and a timestamp corresponding to each detected touch position.

In general, touch screen 811 and its touch sensors (and one or more keys, if included) are used to provide a textual and graphical user interface for the touchscreen device 800B. In an example, touch screen 811 provides viewable content to the user at lighting control device 220B. Touchscreen device 800B also enables the user to interact directly with the viewable content provided in the content display area, typically by touching the surface of the screen with a finger or an implement such as a stylus.

Figure 9:
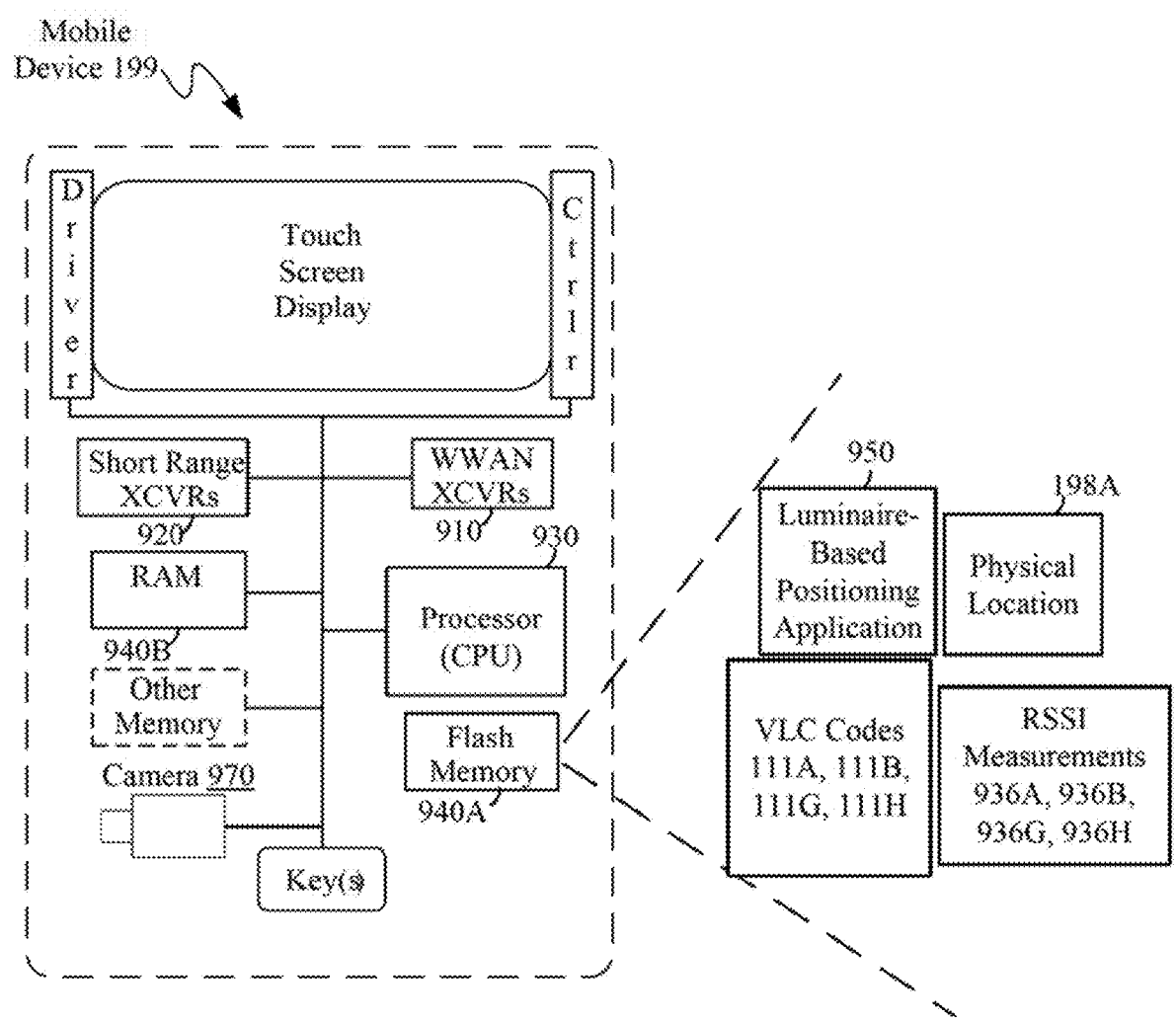
FIG. 9 is a block diagram of the mobile device 199 that communicates via the lighting system 100 of FIGS. 1A-E and RF system of FIGS. 2A-E.

FIG. 9 is a block diagram of the mobile device 199 that communicates via the lighting system 100 of FIGS. 1A-E and RF system 200 of FIGS. 2A-E. Shown are elements of a touch screen type of mobile device 199 having a luminaire-based positioning application 950 loaded, although other non-touch type mobile devices can be used in the luminaire-based positioning communications and controls under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 9 therefore provides a block diagram illustration of the example mobile device 199 having a touch screen display for displaying content and receiving user input as (or as part of) the user interface.

The activities that are the focus of discussions here typically involve data communications related to determining a physical location 198 of a user 197 (e.g., human or robot) of the mobile device 199 traversing or otherwise navigating through the indoor space 105. As shown in FIG. 9, the mobile device 199 includes at least one digital or analog digital transceiver 920, which is a network communication interface for wireless communications. For example, short range XCVR 920 is for short-range digital communication over the local wireless communication network 106, 108, such as NFC, VLC, DECT, ZigBee, Bluetooth, or WiFi. As shown, for the physical location 198A, the RSSI measurements 936A, 936B, 936G, 936H are taken between the mobile device 199 and commissioned luminaires 110A, 110B, 110G, and 110H. The physical location 198A is triangulated and/or trilaterated to the sets of commissioned location coordinates 127A, 127B, 127G, and 127H.

Alternatively or additionally, mobile device 199 can also include a camera 970, such as a rolling shutter camera, for VLC-based positioning measurements based on VLC codes 111x received from commissioned luminaires 110A-Q, as described above. As shown, for the physical location 198A, the VLC codes 111A, 111B, 111G, and 111H with respective signals strengths are received by the mobile device 199 as visible light from commissioned luminaires 110A, 110B, 110G, and 110H. The physical location 198A is triangulated and/or trilaterated to the sets of commissioned location coordinates 127A, 127B, 127G, and 127H.

Mobile device 199 also includes another wireless wide area network transceiver (WWAN XCVR) 910 for communication over a wide area wireless mobile communication network 130. The WWAN transceiver 910 (network communication interface) conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." In one example, the transceiver 910 sends and receives a variety of signaling messages in support of various data services provided by a network of a wireless service provider, to user(s) via a mobile communication network (not shown).

Transceivers 910, 920 connect through RF send-and-receive amplifiers (not shown) to an antenna (not shown). For example, transceivers 910, 920 provide two-way wireless communication of information including digitized audio signals, still image and/or video signals, web page information for display as well as web related inputs, and various types of mobile communications to/from the mobile device 199 to the commissioned luminaires 110A-Q and/or gateway 120 for detecting the physical location 198A-C of the mobile device 199 of the user 197 in the indoor space 105. Several of these types of communications through the transceivers 910, 920 and a network, as discussed previously, relate to protocols and procedures in support of communications with the commissioned luminaires 110A-Q for calculating an indoor position of the mobile device 199. Such communications, for example, may utilize IP packet data transport over the local wireless communication network (e.g., mesh network) of the RF commissioning network band 106 utilizing the digital short range wireless transceiver (XCVR) 620.

Mobile device 199 also supports wireless local area network communications over Wi-Fi, instead of or in addition to data communications using Bluetooth. Hence, in the example of FIG. 9, for packet data communications, the mobile device 199 can include multiple short range XCVRs 920, such as both a Wi-Fi transceiver and a Bluetooth transceiver and associated antenna (not shown). Although Bluetooth and Wi-Fi are used here as examples, the transceiver 920 may take the form of any available two-way wireless local area network (WLAN) transceiver of a type that is compatible with one or more standard protocols of communication implemented in wireless local area networks, such as one of the Wi-Fi standards under IEEE 802.11 and/or WiMAX and wireless mesh network standards (e.g., Zigbee).

The mobile device 199 further includes a processor, shown as CPU 930, sometimes referred to herein as the host controller. Processor 930 serves as a programmable host controller for the mobile device 199 by configuring the mobile device 199 to perform various operations, for example, in accordance with instructions or programming executable by processor 930. For example, such operations may include various general operations of the smartphone, as well as operations related to communications with the commissioned luminaires 110A-Q and the gateway 120. Although a processor may be configured by use of hardwired logic, typical processors in mobile devices are general processing circuits configured by execution of programming.

The mobile device 199 includes a memory or storage system, for storing data and programming. In the example, the memory system may include a flash memory 940A and a random access memory (RAM) 940B. The RAM 940B serves as short term storage for instructions and data being handled by the processor 930, e.g. as a working data processing memory. The flash memory 940A typically provides longer term storage.

Hence, in the example of mobile device 199, the flash memory 940A is used to store programming or instructions for execution by the processor 930. Depending on the type of device, the mobile device 199 stores and runs a mobile operating system through which specific applications, including a luminaire-based positioning application 950 (which may be a web browser executing a dynamic web page), runs on mobile device 199. Examples of mobile operating systems include Google Android, Apple iOS (I-Phone or iPad devices), Windows Mobile, Amazon Fire OS, RIM BlackBerry operating system, or the like. Flash memory 940A may also be used to store mobile configuration settings for different mobile applications or services executable at mobile device 199 using processor 930. As shown, the flash memory 640A, includes: RSSI measurements 936A, 936B, 936H, 936H between the mobile device 199 and three or more commissioned luminaires 110A, 110B, 110G, and 110H; VLC codes 111A, 111B, 111G, and 111H of the three or more commissioned luminaires 110A, 110B, 110G, and 110H; and the calculated physical location 198A of the mobile device 199 in the indoor space 105.

Any of the steps or functionality, e.g., of the OOB commissioning techniques, such as OOB protocol 299, described herein for RF nodes 208A-W (e.g., LSEs 209A-W, e.g., luminaires 110A-T; LCDs 220A-B; and occupancy, daylight or audio sensor 245), commissioning device 180, gateway 120, cloud computing device 166, and mobile device 199 can be embodied in programming or one more applications as described previously. This includes, for example, OOB commissioning programming 117 and commissioning device programming 184.

According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++), procedural programming languages (e.g., C or assembly language), or firmware. In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A lighting system, comprising:
a plurality of uncommissioned luminaires located in a space, wherein a respective uncommissioned luminaire includes:
 a light source to emit visible light;
 a luminaire multi-band communication interface system including:
  a driver circuit coupled to the light source to modulate the emitted visible light from the light source for visible light communication (VLC) over a VLC communication band, and
  a luminaire radio frequency (RF) transceiver configured for short-range wireless communication over an RF commissioning network band;
 a luminaire memory including: (i) a respective VLC code, and (ii) a respective RF identifier;
 a luminaire processor coupled to the driver circuit, the luminaire RF transceiver, and the luminaire memory; and
 out-of-band (OOB) commissioning programming in the luminaire memory, wherein execution of the OOB commissioning programming by the luminaire processor configures the respective uncommissioned luminaire to implement functions, including functions to:
  control the light source, via the driver circuit, to transmit over the VLC communication band, the respective VLC code to the commissioning device; and
  transmit, via the luminaire RF transceiver over the RF commissioning network band, the respective RF identifier to a commissioning device;
wherein the commissioning device includes:
 a commissioning device multi-band communication interface system including:
  a commissioning device visible light camera to receive VLC over the VLC communication band, and
  a commissioning device RF transceiver configured for short-range wireless communication over the RF commissioning network band;
 a commissioning device memory;
 a commissioning device processor coupled to the visible light camera, the commissioning device RF communication interface system, and the commissioning device memory; and
 commissioning device programming in the commissioning device memory, wherein execution of the commissioning device programming by the commissioning device processor configures the commissioning device to implement functions, including functions to:
  receive, via the commissioning device visible light camera, over the VLC communication band, the respective VLC code of the respective uncommissioned luminaire;
  receive, via the commissioning device RF transceiver, over the RF commissioning network band, the respective RF identifier of the respective uncommissioned luminaire;
  in response to receiving the respective VLC code and the respective RF identifier, determine whether the respective uncommissioned luminaire is in a candidate luminaire roster of candidate luminaires suitable for commissioning in the space; and
  based on the determination of whether respective uncommissioned luminaire is in the candidate luminaire roster, accept or reject commissioning of the respective uncommissioned luminaire in the space.

2. The lighting system of claim 1, wherein:
the respective VLC code is for determining a physical location in the space of a mobile device of a user.

3. The lighting system of claim 1, wherein:
the commissioning device memory includes the candidate luminaire roster;
the candidate luminaire roster includes a plurality of candidate VLC codes and a plurality of candidate RF identifiers, wherein a respective candidate VLC code is associated with a respective candidate RF identifier; and
the function to determine whether the respective uncommissioned luminaire is in the candidate luminaire roster of candidate luminaires suitable for commissioning in the space includes to:
 compare the respective VLC code and the respective RF identifier with the candidate luminaire roster for a match of both the respective candidate VLC code and the associated respective candidate RF identifier.

4. The lighting system of claim 3, wherein:
execution of the commissioning device programming by the commissioning device processor configures the commissioning device to implement functions to:
 determine that the respective uncommissioned luminaire is in the candidate luminaire roster of candidate luminaires suitable for commissioning in the space; and
 based on the determination that the respective uncommissioned luminaire is in the candidate luminaire roster, accept commissioning of the respective uncommissioned luminaire in the space.

5. The lighting system of claim 1, wherein:
the commissioning device memory includes a luminaire node map of commissioned luminaires in the space, the luminaire node map including:
 a plurality of commissioned luminaire settings of each commissioned luminaire in the space, wherein a respective commissioned luminaire setting of a respective commissioned luminaire includes:
  (a) a respective commissioned VLC code, and
  (b) a respective commissioned luminaire RF identifier;
execution of the commissioning device programming by the commissioning device processor configures the commissioning device to implement functions, including functions to:
 in response to accepting commissioning of the respective uncommissioned luminaire in the space, commission the respective uncommissioned luminaire in the space, wherein the function to commission the respective uncommissioned luminaire in the space includes to:

update the luminaire node map to include a respective commissioned luminaire setting of the respective uncommissioned luminaire, wherein the respective commissioned luminaire setting stores:
(i) the respective VLC code as the respective commissioned VLC code, and
(ii) the respective RF identifier as the respective commissioned luminaire RF identifier.

6. The lighting system of claim 5, wherein:
the commissioning device RF communication interface system further includes:
a second commissioning device RF transceiver configured for wireless communication over: (a) a local area network (LAN) to a gateway, or (b) a wide area network (WAN) to a cloud computing device;
execution of the commissioning device programming by the commissioning device processor configures the commissioning device to implement functions to:
transmit the updated luminaire node map, via the second commissioning device RF transceiver over: (a) the LAN to the gateway, or (b) the WAN to the cloud computing device.

7. The lighting system of claim 6, wherein:
execution of the commissioning device programming by the commissioning device processor configures the commissioning device to implement functions to:
transmit the updated luminaire node map, via the second commissioning device RF transceiver over the LAN to the gateway;
the gateway includes:
a gateway network communication interface system including a gateway local wireless network communication interface configured for wireless communication over the LAN;
a gateway memory;
a gateway processor coupled to the gateway network communication interface system and the gateway memory;
gateway commissioning programming in the gateway memory, wherein execution of the gateway commissioning programming by the gateway processor configures the gateway to implement functions, including functions to:
receive, via the gateway local wireless network communication interface, over the LAN, the updated luminaire node map from the commissioning device.

8. The lighting system of claim 1, wherein:
the commissioning device RF communication interface system further includes: a second commissioning device RF transceiver configured for wireless communication over a local area network (LAN) to a gateway;
execution of the commissioning device programming by the commissioning device processor configures the commissioning device to implement functions to transmit the respective VLC code and the respective RF identifier, via the second commissioning device RF transceiver over the LAN to the gateway;
the gateway includes:
a gateway network communication interface system including a gateway local wireless network communication interface configured for wireless communication over the LAN;
a gateway memory that includes the candidate luminaire roster, wherein the candidate luminaire roster includes a plurality of candidate VLC codes and a plurality of candidate RF identifiers, wherein a respective candidate VLC code is associated with a respective candidate RF identifier; and
a gateway processor coupled to the gateway network communication interface system and the gateway memory;
gateway commissioning programming in the gateway memory, wherein execution of the gateway commissioning programming by the gateway processor configures the gateway to implement functions, including functions to:
receive, via the gateway local wireless network communication interface, over the LAN, the respective VLC code and the respective RF identifier from the commissioning device; and
compare the respective VLC code and the respective RF identifier with the candidate luminaire roster for a match of both the respective candidate VLC code and the associated respective candidate RF identifier; and
determine that the respective uncommissioned luminaire is in the candidate luminaire roster of candidate luminaires suitable for commissioning in the space; and
based on the determination that the respective uncommissioned luminaire is in the candidate luminaire roster, accept commissioning of the respective uncommissioned luminaire in the space.

9. The lighting system of claim 8, wherein:
the gateway memory includes a luminaire node map of commissioned luminaires in the space, the luminaire node map including:
a plurality of commissioned luminaire settings of each commissioned luminaire in the space, wherein a respective commissioned luminaire setting of a respective commissioned luminaire includes:
(a) a respective commissioned VLC code associated with the respective commissioned luminaire, and
(b) a respective commissioned luminaire RF identifier associated with the respective commissioned luminaire;
execution of the gateway commissioning programming by the gateway processor configures the commissioning device to implement functions, including functions to:
in response to accepting commissioning of the respective uncommissioned luminaire in the space, commission the respective uncommissioned luminaire in the indoor space, wherein the function to commission the respective uncommissioned luminaire in the space includes to:
update the luminaire node map to include a respective commissioned luminaire setting of the respective uncommissioned luminaire, wherein the respective commissioned luminaire setting stores:
(i) the respective VLC code as the respective commissioned VLC code, and
(ii) the respective RF identifier as the respective commissioned luminaire RF identifier.

10. The lighting system of claim 9, wherein:
the gateway network communication interface system further includes a gateway wide area network (WAN) communication interface configured for communication over a WAN to a cloud computing device;
execution of the gateway commissioning programming by the gateway processor configures the gateway to implement functions to:

transmit, the updated luminaire node map, via the gateway WAN communication interface over the WAN to the cloud computing device;

the cloud computing device includes:
- a cloud computing device WAN communication interface configured for communication over the WAN;
- a cloud computing device memory;
- a cloud computing device processor coupled to the cloud computing device WAN communication interface and the cloud computing device memory; and
- cloud computing device commissioning programming in the cloud computing device memory;
- execution of the cloud computing device commissioning programming by the cloud computing device processor configures the cloud computing device to implement functions, including functions to:
  - receive the updated luminaire node map, via the cloud computing device WAN communication interface over the WAN, from the gateway; and
  - in response to receiving the updated luminaire node map from the gateway, store the updated luminaire node map.

11. The lighting system of claim 1, wherein:
the commissioning device RF communication interface system further includes:
- a second commissioning device RF transceiver configured for wireless communication over: (i) a local area network (LAN) to a gateway, or (ii) a wide area network (WAN) to a cloud computing device;

the function to determine whether the respective uncommissioned luminaire is in the candidate luminaire roster of candidate luminaires suitable for commissioning in the space includes:
- transmit the respective VLC code and the respective RF identifier, via the second commissioning device RF transceiver, over: (a) the LAN to the gateway, or (b) the WAN to the cloud computing device; and
- receive the determination of whether the respective uncommissioned luminaire is in the candidate luminaire roster of candidate luminaires suitable for commissioning in the space, via the second commissioning device RF transceiver, over: (a) the LAN from the gateway, or (b) the WAN from the cloud computing device.

12. The lighting system of claim 11, wherein:
the function to determine whether the respective uncommissioned luminaire is in the candidate luminaire roster of candidate luminaires suitable for commissioning in the space includes to:
- transmit the respective VLC code and the respective RF identifier, via the second commissioning device RF transceiver over the LAN to the gateway; and
- receive the determination of whether the respective uncommissioned luminaire is in the candidate luminaire roster of candidate luminaires suitable for commissioning in the space, via the second commissioning device RF transceiver, over the LAN from the gateway.

13. The lighting system of claim 1, wherein:
the function to transmit, via the luminaire RF transceiver over the RF commissioning network band, the respective RF identifier to the commissioning device includes to:
- broadcast, via the luminaire RF transceiver over the RF commissioning network band, an advertisement packet that includes the respective RF identifier; and the function to determine whether the respective uncommissioned luminaire is in the candidate luminaire roster of candidate luminaires suitable for commissioning in the space is further in response to receiving the respective VLC code and the respective RF identifier within a predetermined time period of each other.

14. The lighting system of claim 1, further comprising:
an unmanned aerial vehicle (UAV) or a robot that includes the commissioning device; and
wherein the UAV or the robot is configured to autonomously traverse the space such that the implemented functions are iteratively performed for each of the plurality of the uncommissioned luminaires located in the space.

15. A method comprising:
controlling an optical wireless communication interface of a respective uncommissioned lighting system element (LSE) of a plurality of LSEs, to transmit over a visible light communication (VLC) communication band, a respective VLC code associated with the respective uncommissioned LSE to a commissioning device;

transmitting, via an LSE radio frequency (RF) transceiver of the respective uncommissioned LSE, over an RF commissioning network band, a respective RF identifier associated with the respective uncommissioned LSE to the commissioning device;

receiving, via an image sensor of the commissioning device, over the VLC communication band, the respective VLC code of the respective uncommissioned LSE;

receiving, via a commissioning device RF transceiver, over the RF commissioning network band, the respective RF identifier of the respective uncommissioned LSE;

in response to receiving the respective VLC code and the respective RF identifier, determining whether the respective uncommissioned LSE is in a candidate LSE roster of candidate LSEs suitable for commissioning in a space; and based on the determination of whether the respective uncommissioned LSE is in the candidate LSE roster, accepting or rejecting commissioning of the respective uncommissioned LSE in the space.

16. The method of claim 15, wherein determining whether the respective uncommissioned LSE is in the candidate LSE roster of candidate LSEs suitable for commissioning in the space includes:
- comparing the respective VLC code and the respective RF identifier with the candidate LSE roster for a match of both a respective candidate VLC code and an associated respective candidate RF identifier.

17. The method of claim 15, wherein:
the uncommissioned lighting system elements include: (i) an uncommissioned luminaire, (ii) an uncommissioned lighting control device, or (iii) an uncommissioned occupancy, daylight, or audio sensor.

18. The method of claim 16, wherein:
at least one of the uncommissioned LSEs includes the luminaire;
the luminaire is ceiling-mounted;
the optical wireless communication interface of the uncommissioned luminaire includes:
- a light source to emit visible light,
- a driver circuit coupled to the light source to control light source operation of the light source, the driver circuit includes a light modulator to modulate the emitted visible light from the light source for VLC over the VLC communication band, and a power supply driven by a line power source; and the image sensor of the uncommissioned LSE includes a visible light camera or a photodetector.

19. The method of claim 16, wherein:

at least one of the uncommissioned LSEs includes the uncommissioned occupancy, daylight, or audio sensor;

the optical wireless communication interface of the uncommissioned occupancy, daylight, or audio sensor includes:

a light source to emit visible light, a driver circuit coupled to the light source to modulate the emitted visible light from the light source for VLC over the VLC communication band, and a power supply driven by a battery power source.

20. A method comprising:

controlling an optical wireless communication interface of the uncommissioned radio frequency (RF) node, to transmit over a visible light communication (VLC) communication band, a VLC code associated with the uncommissioned RF node to a commissioning device;

transmitting, via an RF node transceiver of the uncommissioned RF node, over an RF commissioning network band, an RF identifier associated with the uncommissioned RF node to the commissioning device;

receiving, via an image sensor of the commissioning device, over the VLC communication band, the VLC code of the uncommissioned RF node;

receiving, via a commissioning device RF transceiver, over the RF commissioning network band, the RF identifier of the uncommissioned RF node;

in response to receiving the VLC code and the RF identifier, determining whether the uncommissioned RF node is in a candidate RF node roster of candidate RF nodes suitable for commissioning; and based on the determination of whether the uncommissioned RF node is in the candidate RF node roster, accepting or rejecting commissioning of the respective uncommissioned RF node.

* * * * *